United States Patent [19]

Lou

[11] 4,454,591
[45] Jun. 12, 1984

[54] INTERFACE SYSTEM FOR BUS LINE CONTROL

[75] Inventor: Perry W. Lou, Houston, Tex.

[73] Assignee: Texas Instruments Incorporated, Dallas, Tex.

[21] Appl. No.: 154,560

[22] Filed: May 29, 1980

[51] Int. Cl.³ ............................ G06F 13/00; G06F 3/00
[52] U.S. Cl. ................................................... 364/900
[58] Field of Search ... 364/200 MS File, 900 MS File

[56] References Cited

PUBLICATIONS

M 6800 Microprocessor Application Manual, Motorola Semiconductor Products Inc., First Edition, Second Printing, 1975.

Primary Examiner—Felix D. Gruber
Assistant Examiner—John G. Mills
Attorney, Agent, or Firm—Rene' E. Grossman; Leo N. Heiting; Melvin Sharp

[57] ABSTRACT

An external I/O pull down latch and a system embodiment thereof. The interface system has a bus line including of a first means for providing an output at a fixed voltage level on said bus line for a first time interval, and a second means coupled to said bus line for maintaining the bus line at the fixed voltage level subsequent to the first time interval. In the preferred embodiment, the second means is comprised of said external I/O pull down latch. The present invention is a replacement for traditional pull up or pull down resistors in controlling I/O bus lines coupling main processor circuits with external memory circuits. In the preferred embodiment, the external I/O pull down latch is comprised of a read-write memory bit cell, sized such that it may be overdriven by any driver attached to the bus line.

11 Claims, 45 Drawing Figures

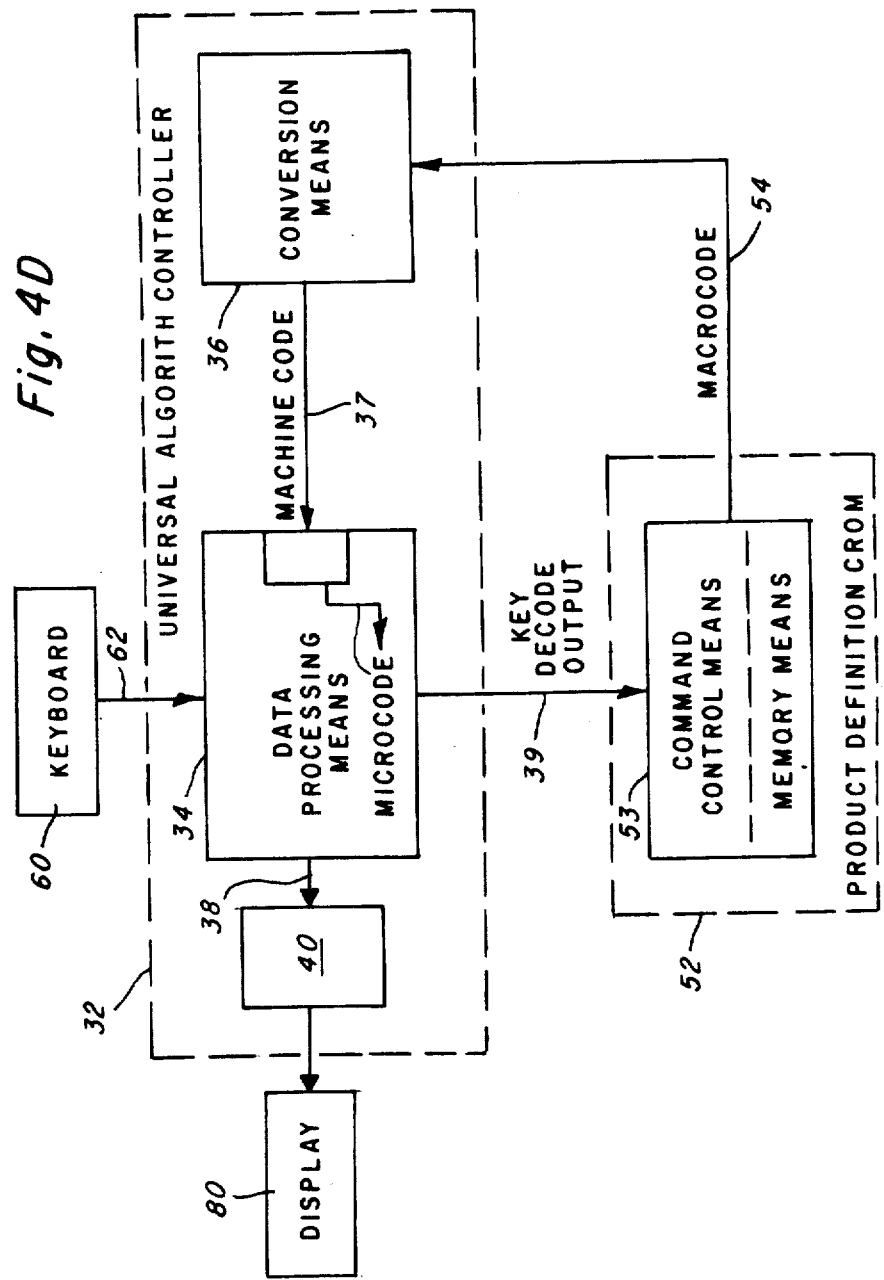

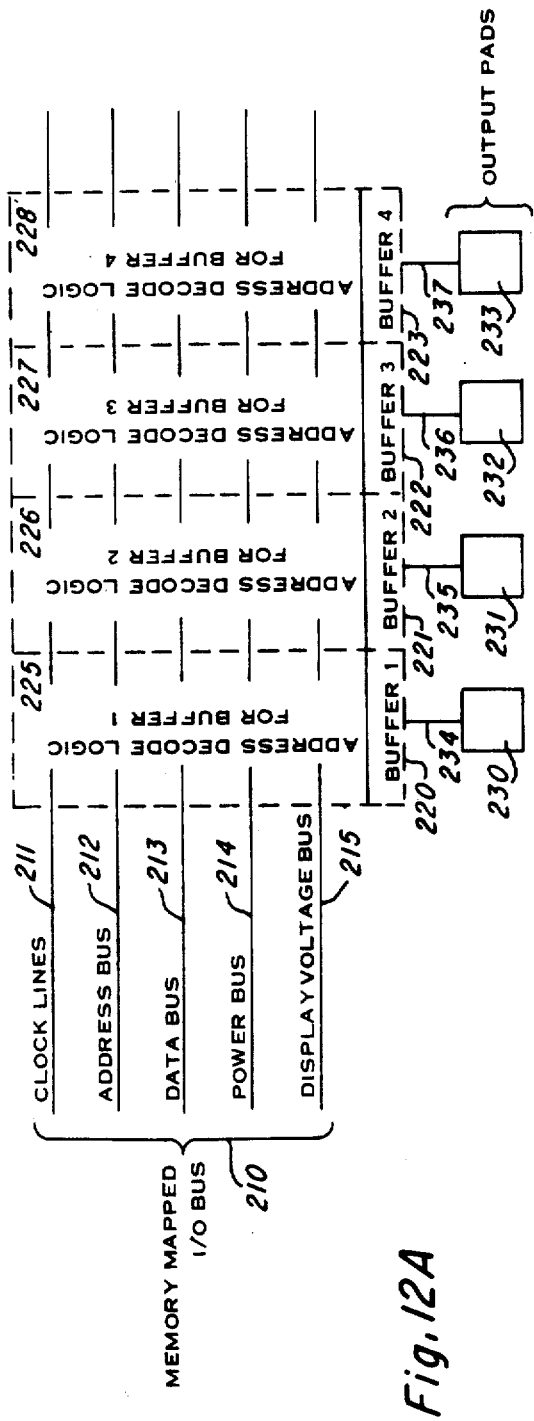
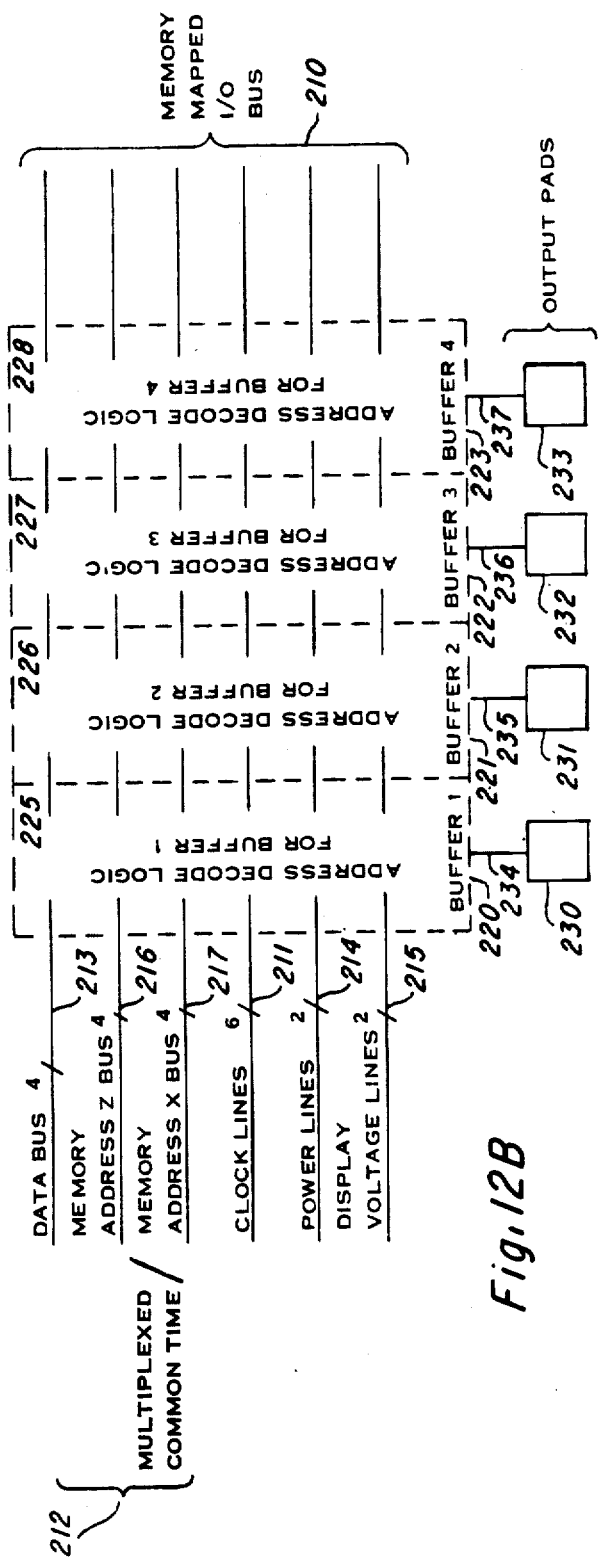
Fig. 12A
Fig. 12B

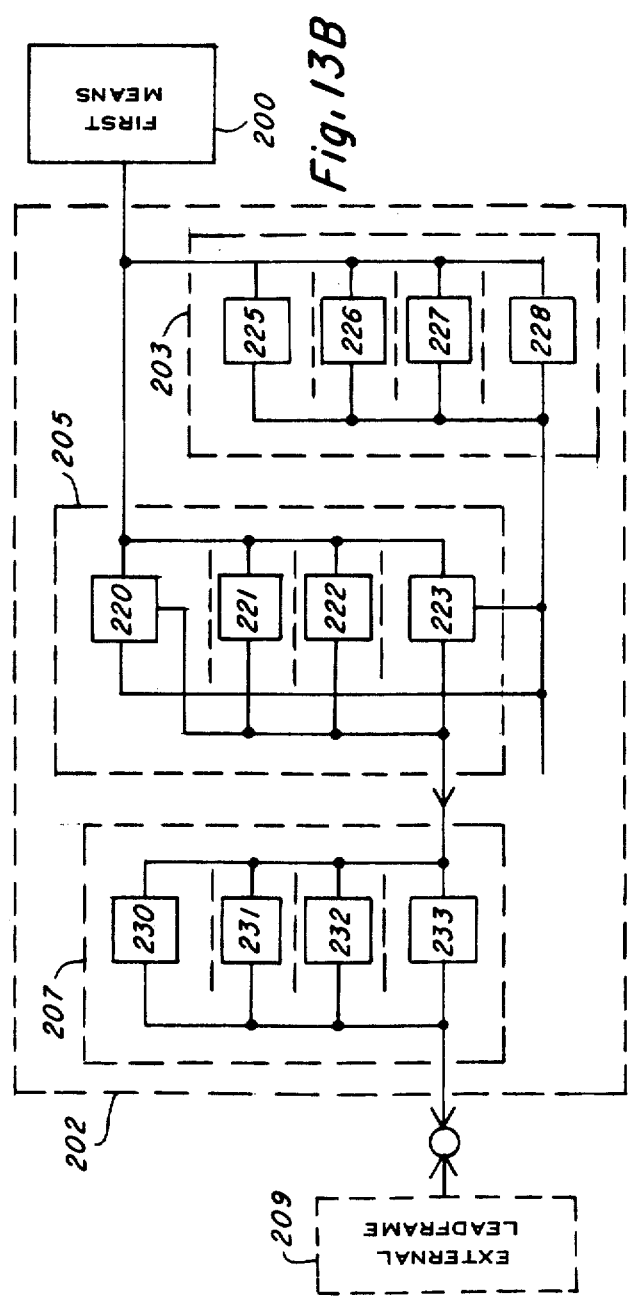

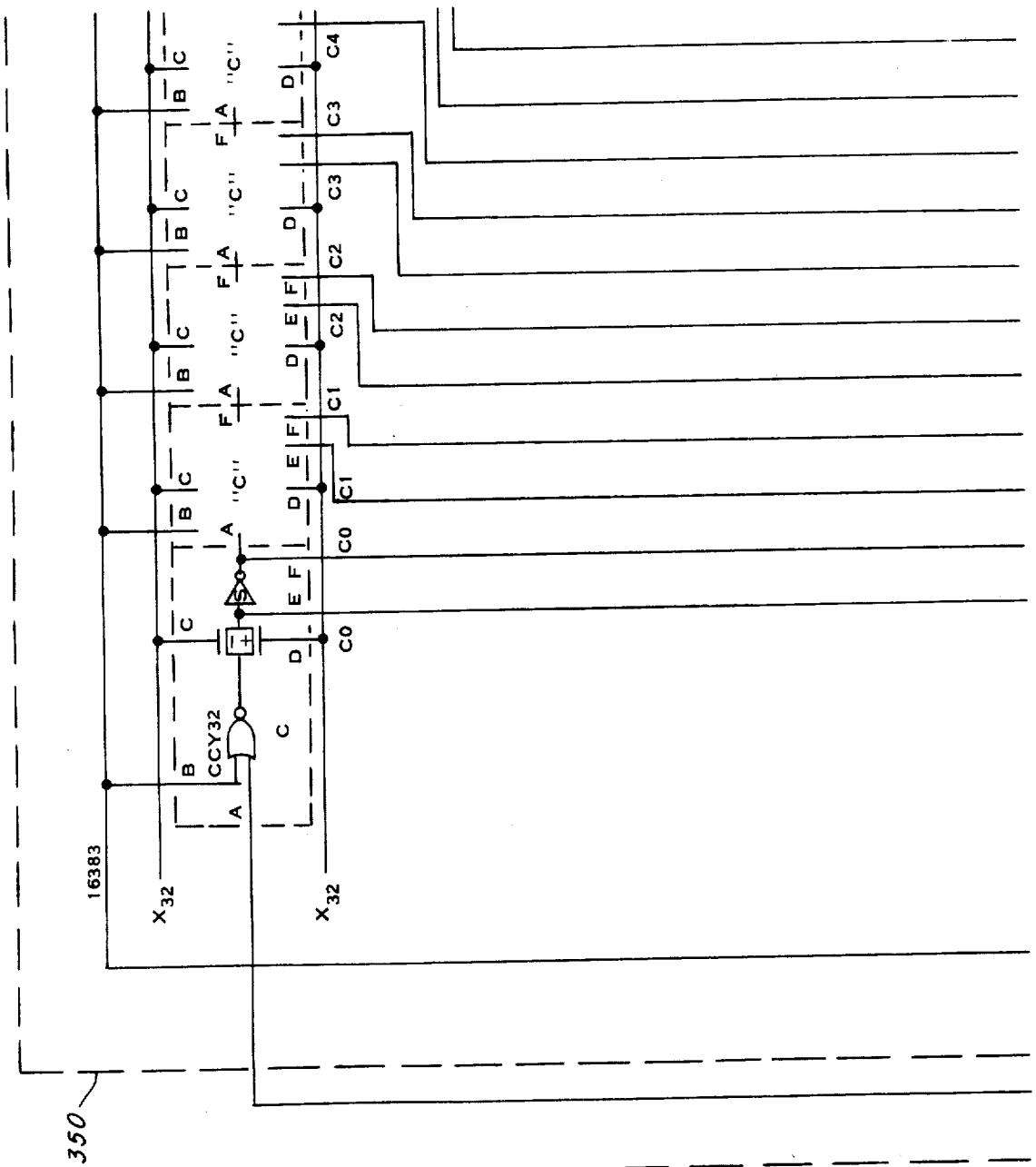
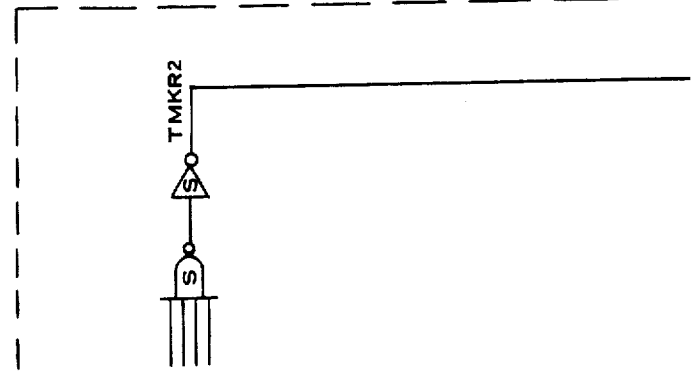
Fig. 18B

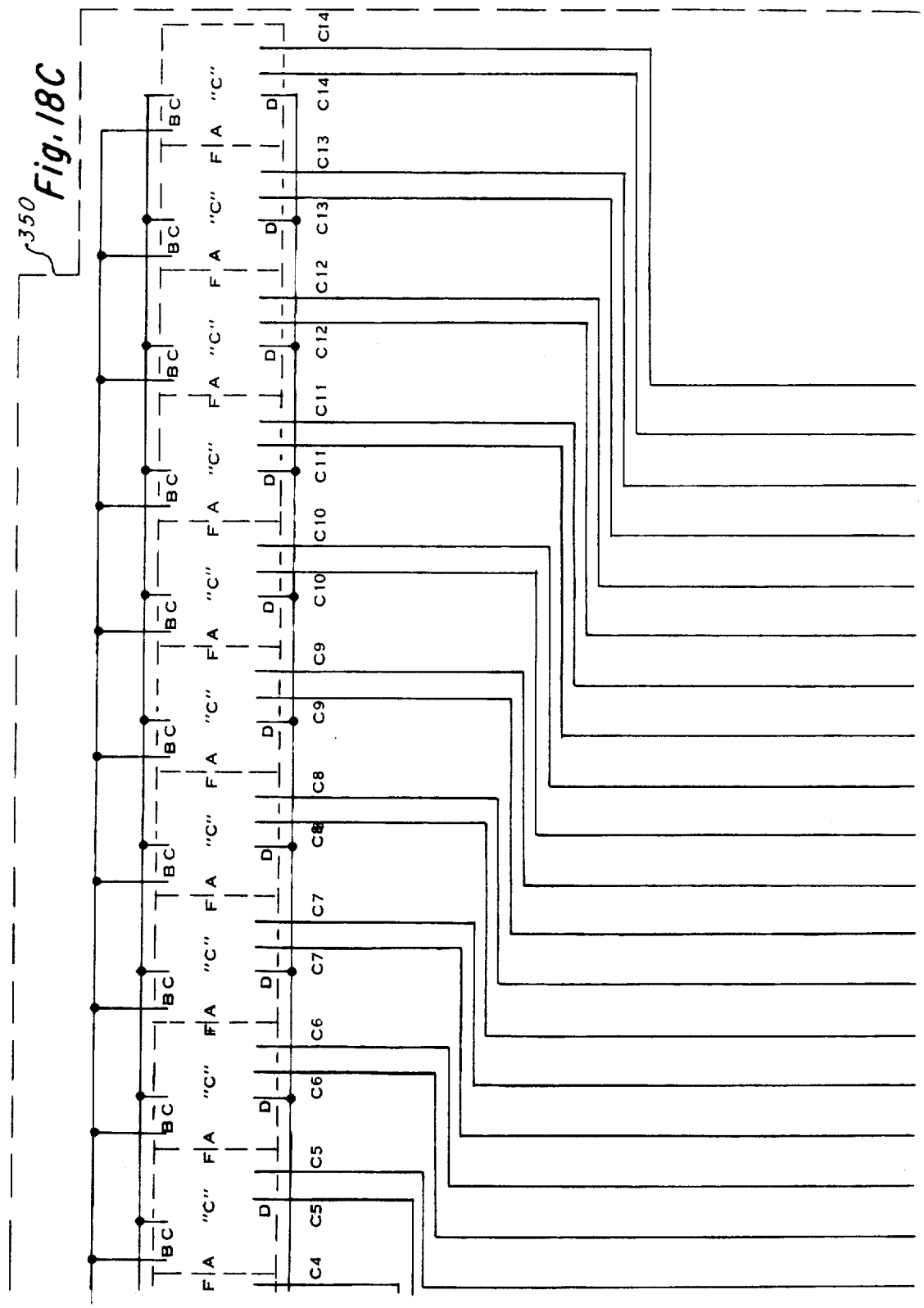

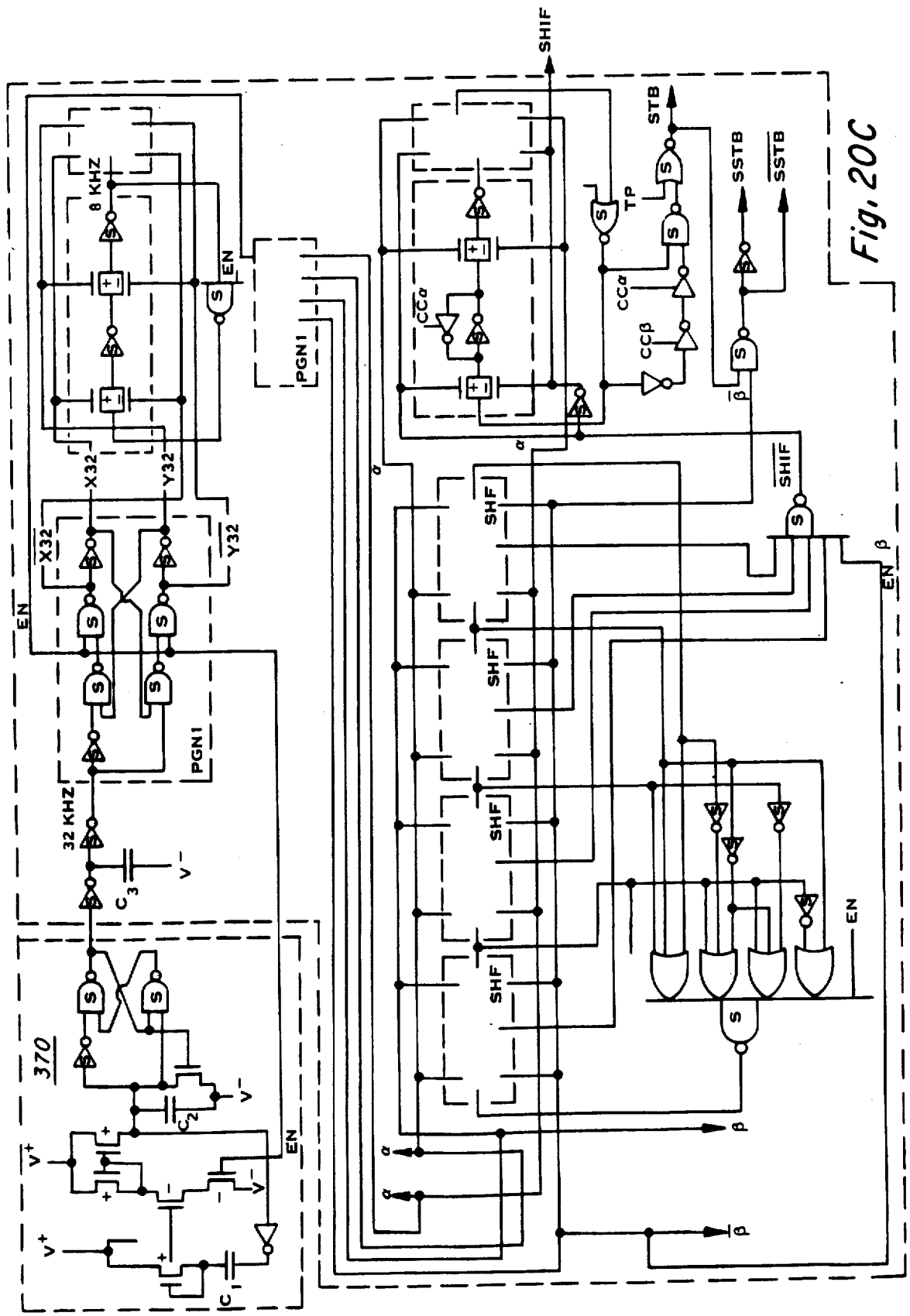

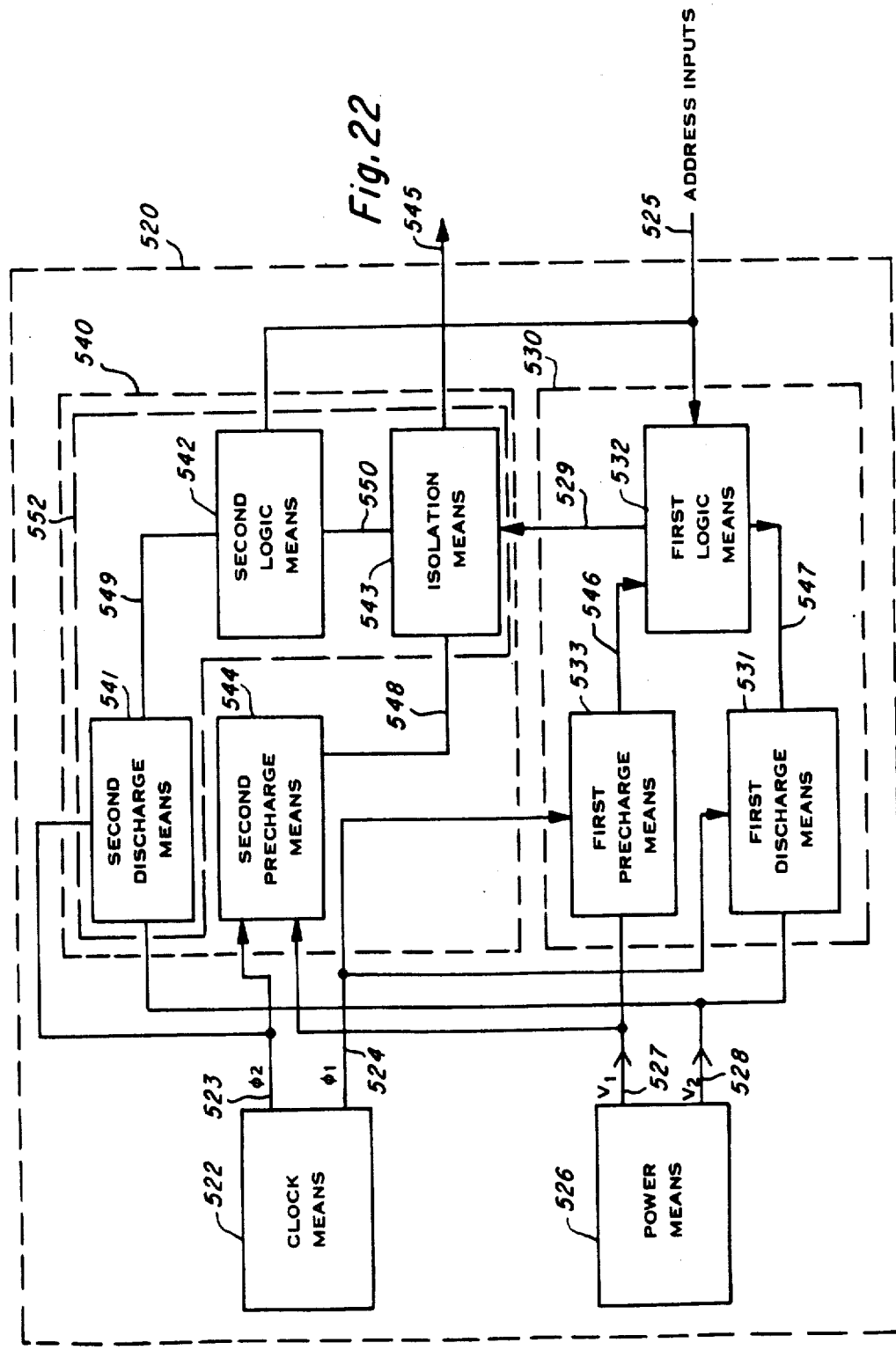

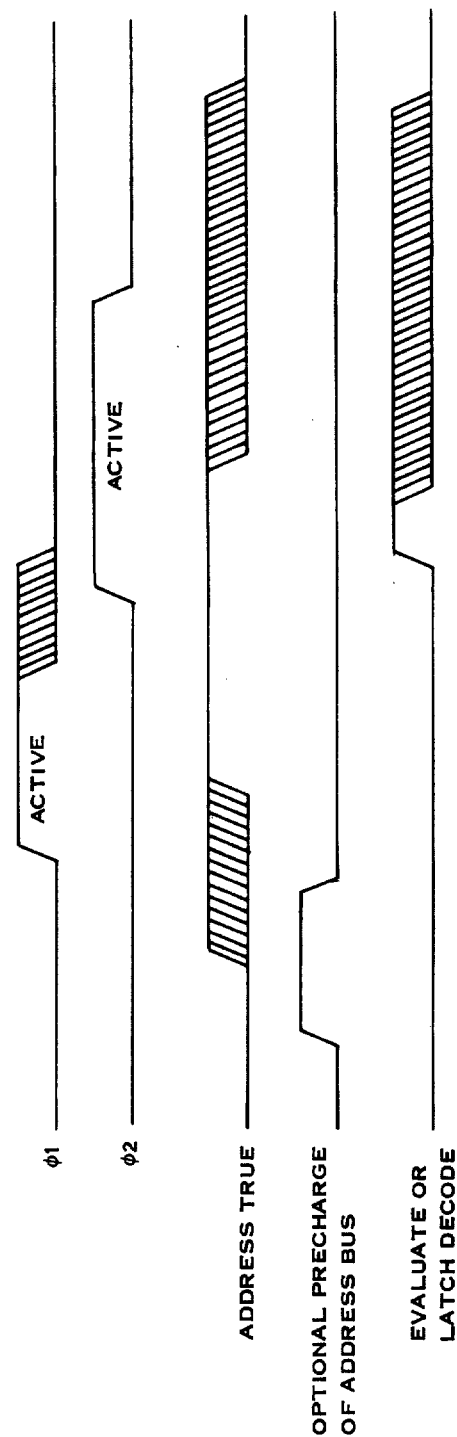

INTERFACE SYSTEM FOR BUS LINE CONTROL

BACKGROUND OF THE INVENTION

This invention relates to the control of a bus line to which a plurality of integrated circuits are coupled, and more particularly to a means to control the logic level of the bus line when all integrated circuits outputs coupled to the bus line are in a default no op state.

Heretofore, communication by multiple integrated circuits along a common bus line have utilized open collector or tri-level (logic 0, logic 1, and high impedance) logic devices to couple to the bus line. To prevent spurious communications, some means of controlling the default state of the bus line must be provided so that when all devices are in a default no op state, the bus line will be at a known logic level. Heretofore, this problem has been solved by the use of pull up or pull down resistors, one end of the resistor coupled to the bus line and the other end of the resistor coupled to a power supply bus. This has the undesirable side effect of dissipating a large amount of power due to the resistive loss. Another solution has been to provide additional control lines to create a master/slave protocol. Thus, a protocol is established between devices where at least one device has control of the bus at all times, and where that one device relinquishes the bus line and another device assumes control of that bus line. This approach has the disadvantage of requiring additional control lines and additional control logic, thereby increasing the size of each integrated circuit in the system and increasing the complexity and size of the total system.

SUMMARY OF THE INVENTION

The present invention controls the default state of a bus line without requiring pull up or pull down resistors and without requiring additional control lines. In the preferred embodiment, a read/write memory bit (bus control memory bit) is coupled to the bus line which is to be controlled, forming a transparent latch. A protocol is established wherein the last integrated circuit device to write onto the bus line must set the bus line to the default (no op) condition. In the preferred embodiment, the default condition is a logic 0 level. The bus control memory bit is sized so that it may be over driven by any driver attached to the bus line. This approach has the advantage of dissipating virtually no power once the line has been set to one or the other logic level. In a preferred embodiment, in a calculator system, a pull down latch of the present invention is included within the controller integrated circuit. The bus line control bit is programmed onto the bus line by the last communicating integrated circuit at the end of a bus line transfer utilizing the bus line. In this preferred embodiment, only one bus line control bit is coupled to any given bus line so as to ease the task of overdriving the bus line. Thus, a single control bit may be coupled to each bus line of the I/O bus which couples between the controller integrated circuits and numerous RAM, ROM and other I/O integrated circuits.

BRIEF DESCRIPTION OF THE DRAWINGS

The novel features believed characteristic of the invention are set forth in the appended claims. The invention itself, however, as well as a preferred mode of use, further objects, and advantages thereof, will be best understood by reference to the following detailed description of illustrative embodiments when read in conjunction with the accompanying drawings, wherein;

FIGS. 4A-D are functional block diagrams of alternate embodiments of a modular system design utilizing the present invention;

FIGS. 12A-B are detailed functional block diagrams of a modular memory mapped I/O interconnection scheme, wherein each buffer has associated with it an individual address decode logic circuit, for use in the controller integrated circuit 30 of FIGS. 4A-D;

FIGS. 13A-B are functional block diagrams of a programmable pinout interconnect means which may be employed in the controller 30 of FIGS. 4A-D, and in the modular integrated circuit designs of FIGS. 6-8;

FIGS. 16A-D show detailed schematic representations of functional blocks from FIGS. 14A-B;

FIGS. 18A-F are detailed schematic representations of the timekeeping logic and associated address decode of FIG. 14B;

FIGS. 20A-C are a detailed schematic representation of the I/O Oscillator, I/O clock generator, and logic associated therewith as described with reference to FIG. 14B;

FIG. 22 is a block diagram of the address decode means of FIGS. 14A-B;

FIG. 24 is a signal timing diagram for the circuitry of FIG. 23;

DETAILED DESCRIPTION OF THE INVENTION

Figure 1:
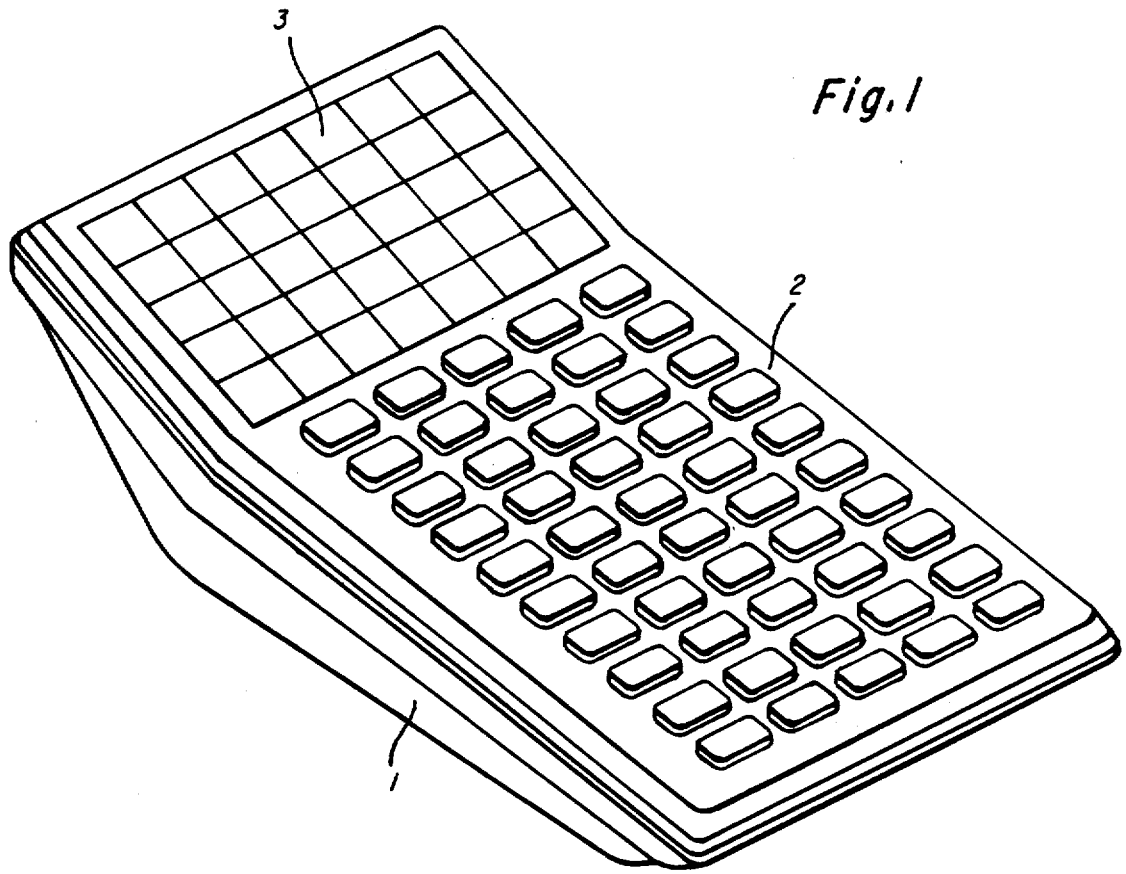
FIG. 1 is a pictoral view of a portable, electronic, handheld calculator of the type which embodies the present invention.

Referring to FIG. 1, an electronic portable calculator of the type wherein the various features of this invention are is shown-and embodied in pictoral form. The calculator 1 includes the keyboard 2, and the display 3. Display 3, in the preferred embodiment, consists of 16 alpha-numeric characters, each provided by liquid crystal display devices, of an array of light emitting diodes, a vacuum florescent tube display, or other display device. The display is preferably implemented having complete alpha-numeric display capability so as to be capable of displaying English language messages as well as permitting the display of data in scientific notation, or other output formats. Of course, the type of display and the number of digits displayed is a design choice. The display may be of the 7 segment, 8 segment, 9 segment, 13 segment, or $5 \times 7$ dot matric display character, depending on the character display flexibility desired. In a preferred embodiment, a $5 \times 7$ dot matrix per character position is utilized to allow for complete alpha-numeric and special character display. A keyboard, 2, or other input means, preferably includes a set of number keys (0–9), a decimal point key, a plurality of function command keys including, for example, exponential, logarithmic, trigonometric and hierarcy functions. The expotential and logarithmetic function command keys include, for example, $X^2$, $\sqrt{X}$, $1/X$, $\log X$, $\ln X$, $y^x$, and $\sqrt[y]{X}$. The trigonometric functions include, for instance, the sine, cosine, tangent, and their inverses, the hyperbolic sine, hyperbolic cosine, and hyperbolic tangent, and inverse hyperbolic functions. Other function command keys include store (STO), and recall (RCL) keys for respectively storing and recalling a number stored in one of the memory registers. The enter exponent key (EE) allows exponent entry of the number displayed in scientific notation. A $+/-$ key is provided for changing the sign of the display number. An exchange kkey (X:Y) is provided for exchanging the operator and the operand of an arithmetic function. More conventional function command keys are supplied, including the clear key (C), the clear entry key (CE) and the plus (+), minus (−), multiply (x), divide (÷), and equal (=) keys. Other function keys, in a preferred embodiment, include alpha-numeric variable keys (A-Z), parenthesis keys, hierarchy control keys, label key (LBL), and programmable feature function keys. The calculator is further provided with OP code keys for performing special functions such as slope, intercept, plotting operations, alpha-numeric operations, operating system hierarchy interface and control and the like.

Figure 2:
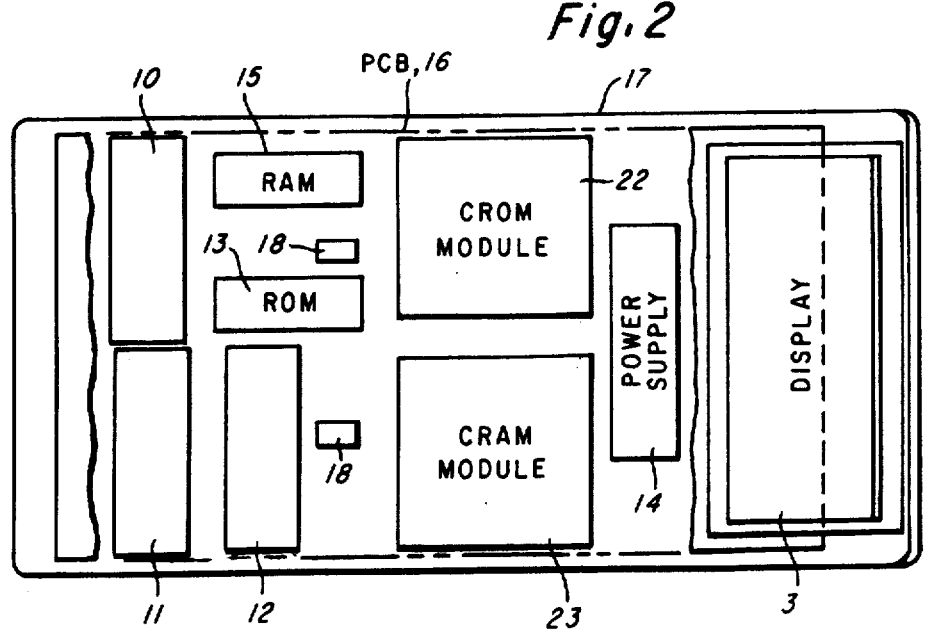
FIG. 2 is a bottom view of the calculator of FIG. 1 showing the placement of major components in the preferred embodiment of the invention of FIG. 1.

Referring to FIG. 2, a bottom view of the calculator 1 of FIG. 1 is shown. The placement of major components in a preferred embodiment of the calculator of FIG. 1 is shown. Controller integrated circuit chips 10, 11, and 12 provides the intelligence and control capabilities of the calculator system. Read/write memory 15, and read only memory 13, provide additional base system data storage beyond that provided on the controller chips 10, 11, and 12. A power supply 14 provides all necessary working voltages to the remainder of the calculator system's electronic components. The controller devices 10, 11 and 12, the read/write memory 15, the read only memory 13, and the power supply 14 are mounted to a main printed circuit board 16 within a calculator case 17. Additionally, compartments within the calculator case 17 are coupled to the main printed circuit board 16 to allow for interconnection of plug-in memory modules 22 and 23 for interconnection to the controller chips 10, 11 and 12.

Figure 3:
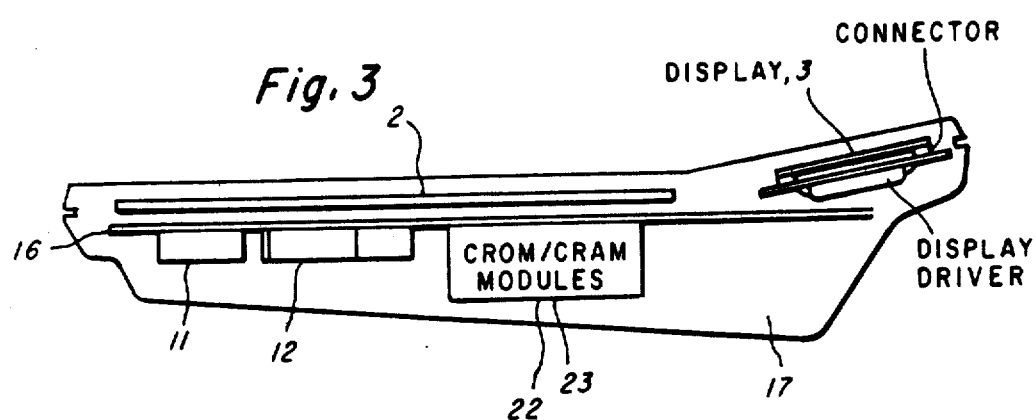
FIG. 3 is a side view of the calculator system of FIGS. 1 and 2 detailing the relative placement of components within the calculator housing.

Referring to FIG. 3, a side view of the calculator system of FIGS. 1 and 2 is shown, detailing the relative placement of the controller chips 10, 11, and 12, the display 3, the keyboard 2, printed circuit board 16, and the memory modules 22 and 23, within the calculator case housing 17.

Figure 4A:
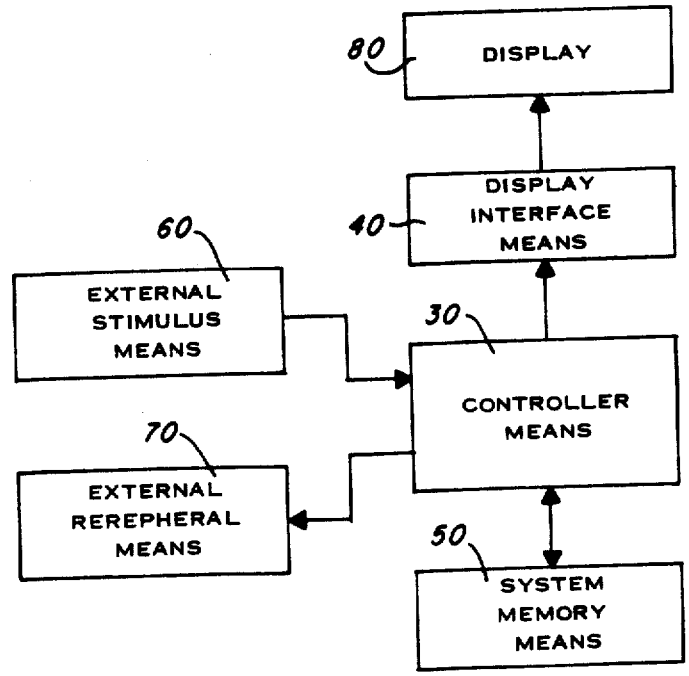
Figure 4B:
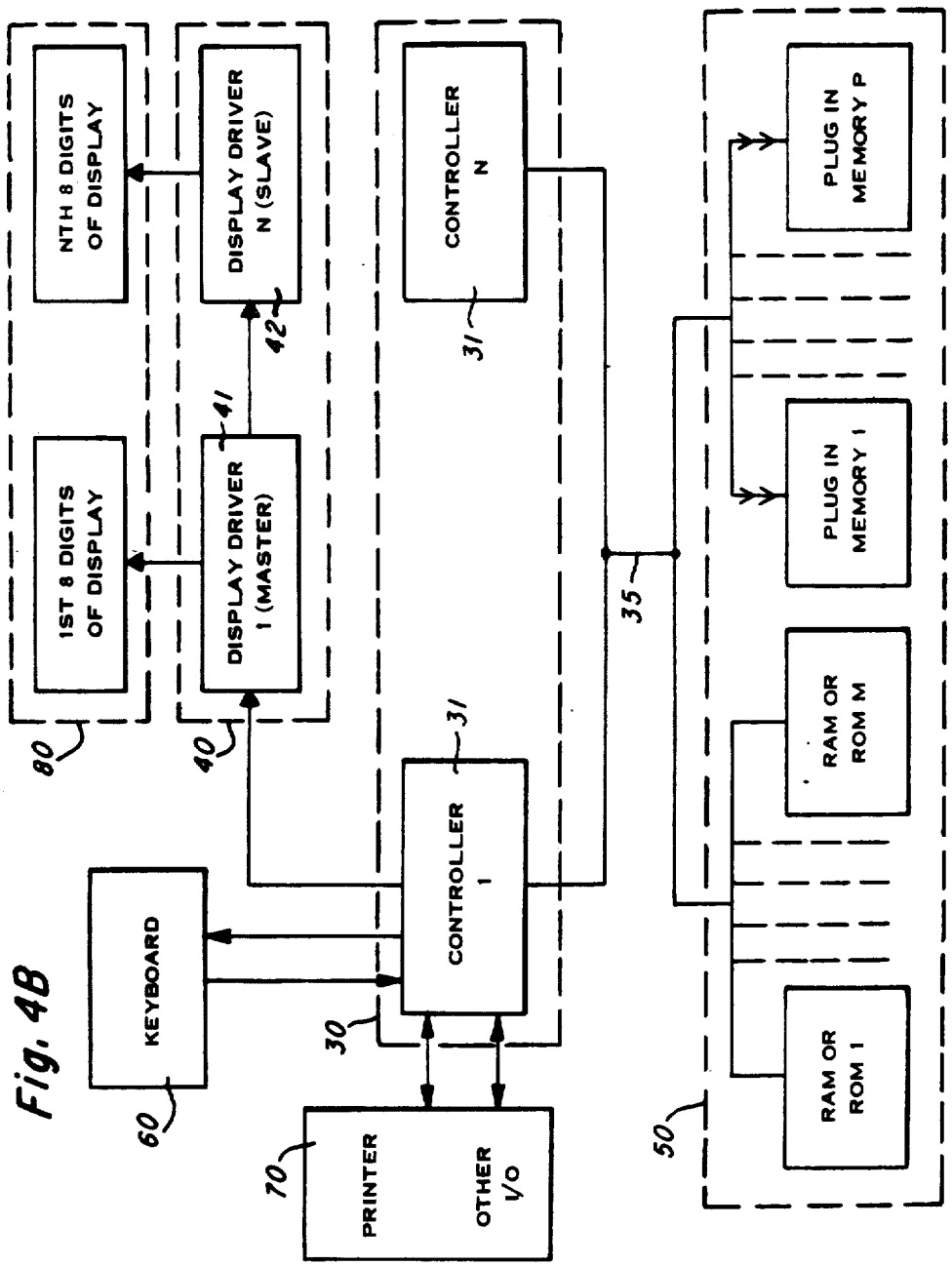

Referring to FIGS. 4A-D, block diagrams of alternate embodiments a modular system design of the present invention are shown. Referring to FIGS. 4A-B, modular controller means 30 is comprised of at least one controller integrated circuit 31 having modular bar size, modular bar I/O, and on bar functional modularity interchangeability within the integrated circuit 31. The controller means 30 provides the central processing capability of the modular system. The controller means 30 comprises a single modular integrated circuit controller 31, or a plurality of modular integrated circuit controllers 31 interactively forming the controller means 30. In a preferred embodiment, each modular integrated circuit controller 31 is comprised of fixed logic including data processing logic, instruction decode, and other processing and decoding logic functions; modular input and modular output interface means; and partitionable blocks of modular memory including read/write memory means and read only memory means. The controller means 30 is coupled to display interface means 40, to system memory means 50, to external input stimulus means 60, and to external peripheral means 70. The display interface means 40 may be comprised of cascadeable display drivers including a master driver and at least one slave driver, as described in greater detail in co-pending application Ser. No. 168,853, A Data Processing System Having Dual Output Modes, filed July 14, 1980. Each display driver, master and slave, individually controls sectional blocks of characters of the display 80. The display 80 may be comprised of audible and/or visual representation indicative of a received display signal. Alternatively, the display interface means 40 may be included within the controller means 30. The display interface means 40 is coupled to the display 80 for providing communications to and power for the display 80. The controller means 30, in a preferred embodiment, communicates only with the master display driver 41, with the master display driver 41 cascading an output to provide communication to the slave display drivers 42, thereby providing for uniform and simplified controller means 30 to display 80 interface, irrespective of the number of characters in the display 80. The system memory means 50 provides additional data storage capability for the controller means 30. In a preferred embodiment, the system memory means 50 is comprised of individual modules of read/write and read only memory means, such as the read/write memory 15, read only memory 13, and the plug-in memory means 22 and 23 as described with reference to FIG. 2. A common communication bus 35 couples the controller means 30 to the read/write and read only memory means of the system memory means 50, as described in greater detail with reference to FIGS. 14–16, and FIG. 26, infra. The external stimulus means 60 is comprised of keyboard input means, external digital data storage means such as magnetic tape, card, or disk, or digital communication means such as a modem. The external peripheral means 70 provides for communication from the controller means 30 to the ultimate user. The external peripheral means 70 is comprised of a hard copy printer, video display, or alternatively provides for non-volatile data storage.

Figure 4C:
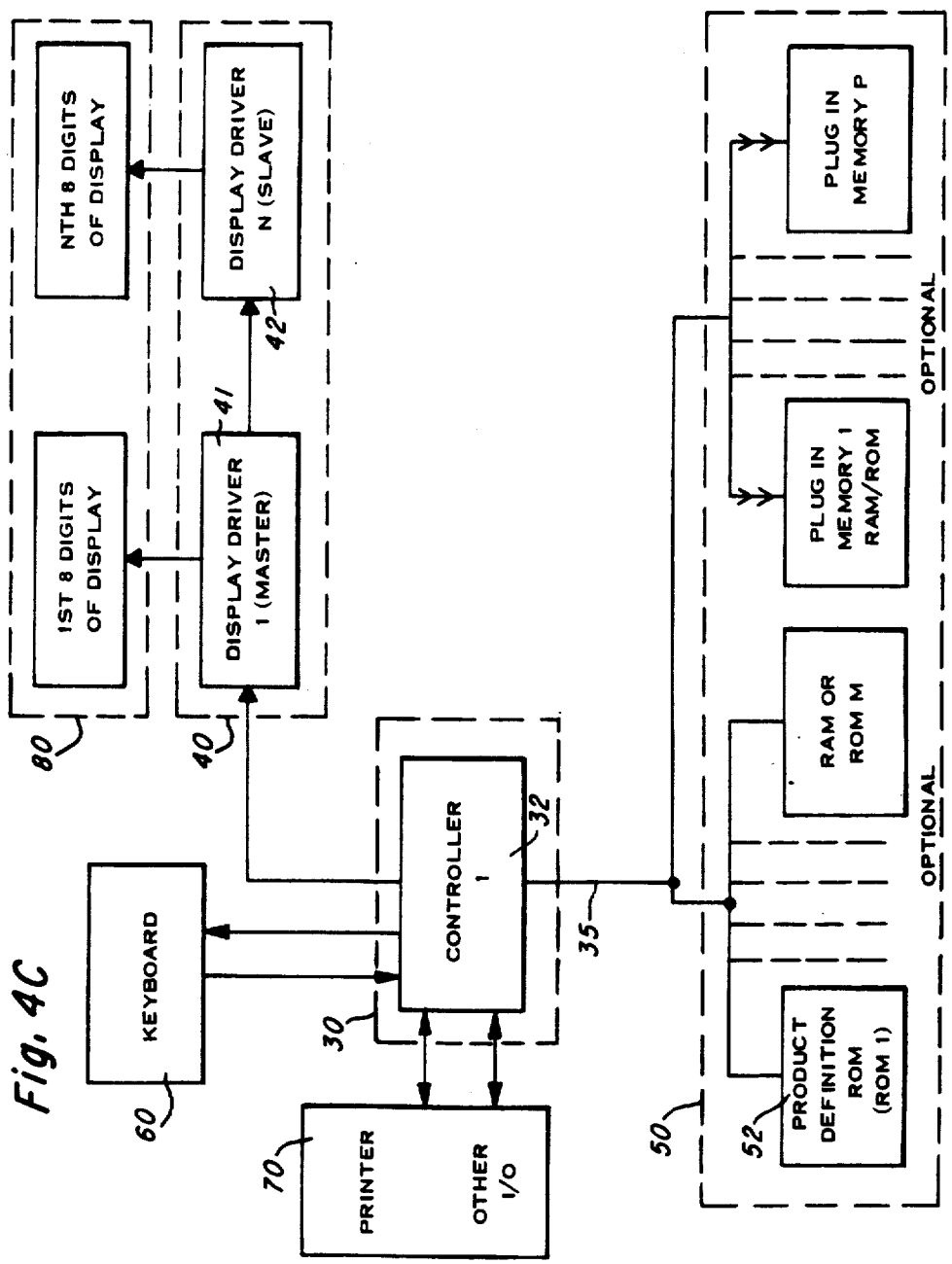

Referring to FIG. 4C, a block diagram of an alternative embodiment of the modular system of the present invention is shown. The block diagram of FIG. 4C is similar to that of FIG. 4B except that in the alternative embodiment the controller means 30 and memory means 50 are different than those shown in FIG. 4B. The controller means 30 is comprised of a universal algorithm controller 32 coupled to the keyboard input means 60, the printer means 70, and the display driver means 40. The display driver means 40 couples to the display 80. Alternatively, the display driver means 40 is included within the universal algorithm controller integrated circuit 32. Furthermore, the universal algorithm controller 32 is cooupled to a product definition ROM 52 in the memory means 50. Additionally, the universal algorithm controller 32 may be coupled to additional RAM or ROM memories within the memory means 50, either as a fixed part of the calculator system, or as plug in memories, as described with reference to FIGS. 2-3.

Referring to FIG. 4D, a detailed block diagram of the universal algorithm controller embodiment of the present invention is shown. The keyboard 60 selectively provides input signals 62 responsive to user provided key activations. The universal algorithm controller integrated circuit 32 is coupled to the keyboard input means 60, and to a command control means 52 comprising the product definition ROM. Additionally, the universal algorithm controller 32 provides an output 38 to drive the display 80. The universal algorithm controller 32 is comprised of a data processing means 34, coupled to the keyboard input means 60, for providing an operation signal, such as a key decode output 39, indicative of the received input signal 62 from the keyboard means, and for providing a display signal 38 in response to receiving an instruction signal 37. A code conversion means 36 is coupled to the data processing means 34 for providing a selected machine code instruction signal 37 in response to receiving a macrocode command signal 54 from the product definition ROM 52. The command control means 53 of the product definition ROM 52 is coupled to the data processing means 34 and to the code conversion means 36 for providing the command signal output 54 in response to receiving the key decode operation signal 39. The unique calculator functions to be performed are stored in macrocode in the memory means 50, including the product definition ROM 52, and may be supplemented by the plug in memories for a new calculator design.

Figure 5A:
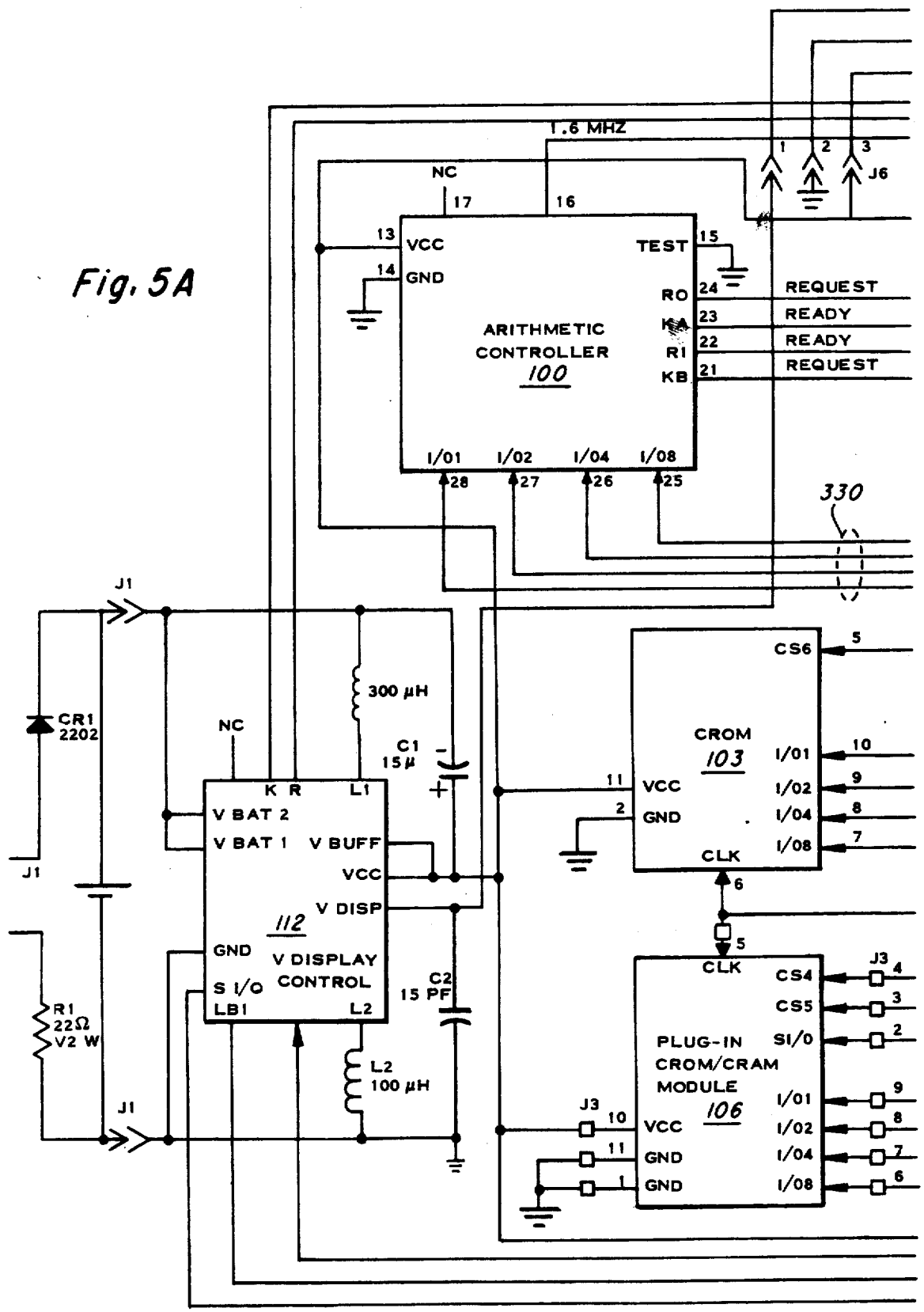
FIGS. 5A-C form a detailed schematic logic diagram of a preferred embodiment of the modular calculator system of FIGS. 4A-B implemented in the calculator of FIG. 2.
Figure 5B:
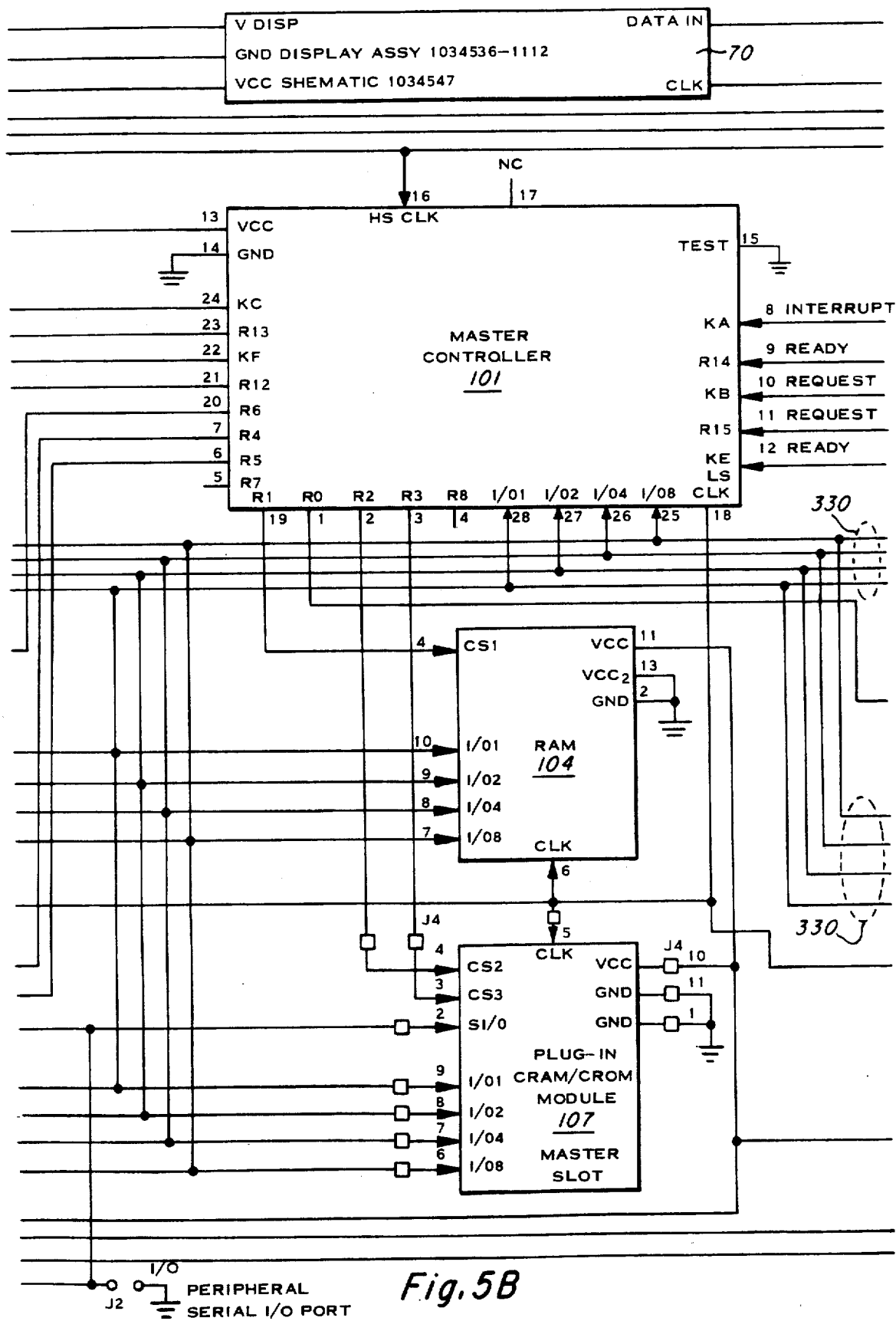
Figure 5C:
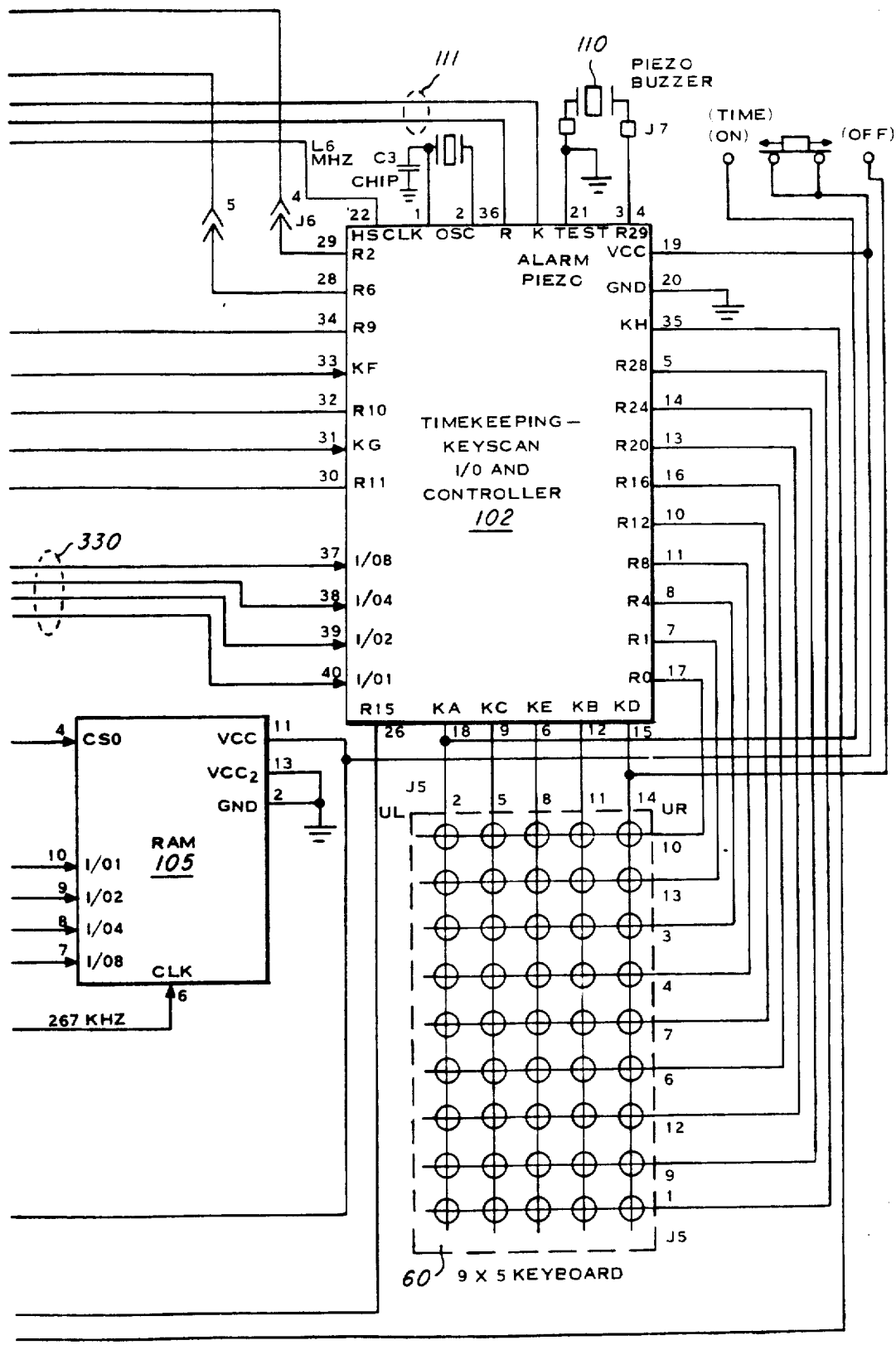

Referring to FIGS. 5A-C, a detailed schematic of an embodiment of the calculator system of FIGS. 4A-B as implemented in the calculator 1 of FIG. 2 is shown.

The calculator system of FIGS. 5A-C is comprised of the controller means 30, as shown in FIGS. 4A-B, expandable in functional blocks, for providing arithmetic processing and data manipulation and processing such as the arithmetic controller 100, master controller 101 and timekeeping, key scan and I/O controller 102; an input means, such as the keyboard 60, coupled to the controller means 30, for providing outputs to the controller means in response to an externally supplied stimulus; a memory means 50 such as the memory 103, 104, 105, 106, and 107, expandable in partioned blocks, coupled to the controller means 30, for storing data and providing data outputs to the controller means 30 in response to receiving select inputs; a display interface means, such as the cascadable display drivers 70 and display interface chip 112, expandable in partioned blocks, coupled to the controller means 30, for receiving outputs from the controller means 30 representative of a desired character display, and providing display drive outputs corresponding to the desired character display compatable in voltage and timing with a selected display technology such as a liquid crystal display; and a display device such as a liquid crystal display, expandable in partioned blocks corresponding to the partioned blocks of the display interface device and connected thereto, the display means being of the particular display technology compatable with the display interface means and timing such as that output from that controller 112, for receiving the outputs from the display interface means and for providing a visable representation of the desired character display in response thereto. As is described in greater detail in copending application Ser. No. 168,853, A Data Processing System Having Dual Output Modes, filed July 14, 1980, the cascadable display driver 70 is comprised of a master display driver and at least one slave display driver, each display driver forming a partitioned block of the display interface. The master display driver being coupled to the controller means and coupled to one of the slave display drivers, the master display driver converting a received output from the controller means into a slave communication output for connection to the first slave display driver, all other slave display drivers being connected in daisy chain with the first slave display driver. Each slave display driver couples the slave communication output from the proceeding slave display driver to the next slave display driver.

In the preferred embodiment, the calculator system of FIGS. 5A-C includes a controller means 30 expandable in functional blocks, for providing arithmetic processing and data manipulation and processing in the master controller 101, and timekeeping I/O functions in controller 102. In the preferred embodiment, the controller 100 of FIG. 5A is combined to be contained with the controller 101. The master controller 101 is coupled to the I/O controller 102 to allow for communication between the individual controllers. The memory means 50 of FIGS. 4A-B is shown in FIGS. 5A-C as comprised of on board read only memory 103 and on-board read/write memories 104 and 105, as well as plug-in memories 106 and 107 which may be either read only, read/write or a combination thereof. The external stimulus means 60 is shown in part as a 9×5 keyboard coupled to the I/O controller 102 of the controller means 30. Additionally, the I/O controller 102 is coupled to an external peripheral piezoelectric buzzer 110, and has provisions for connection to an additional external peripheral, such as printer connection 111. The display interface 40 is comprised of the cascadable display drivers 70 and the display interface voltage controller chip 112. The display voltage controller chip provides regulated multi-voltage power source supplies to the integrated circuit chips of the calculator system of FIGS. 5A-C, and voltages for coupling to the display driver which generates its own multiple voltages.

Figure 6:
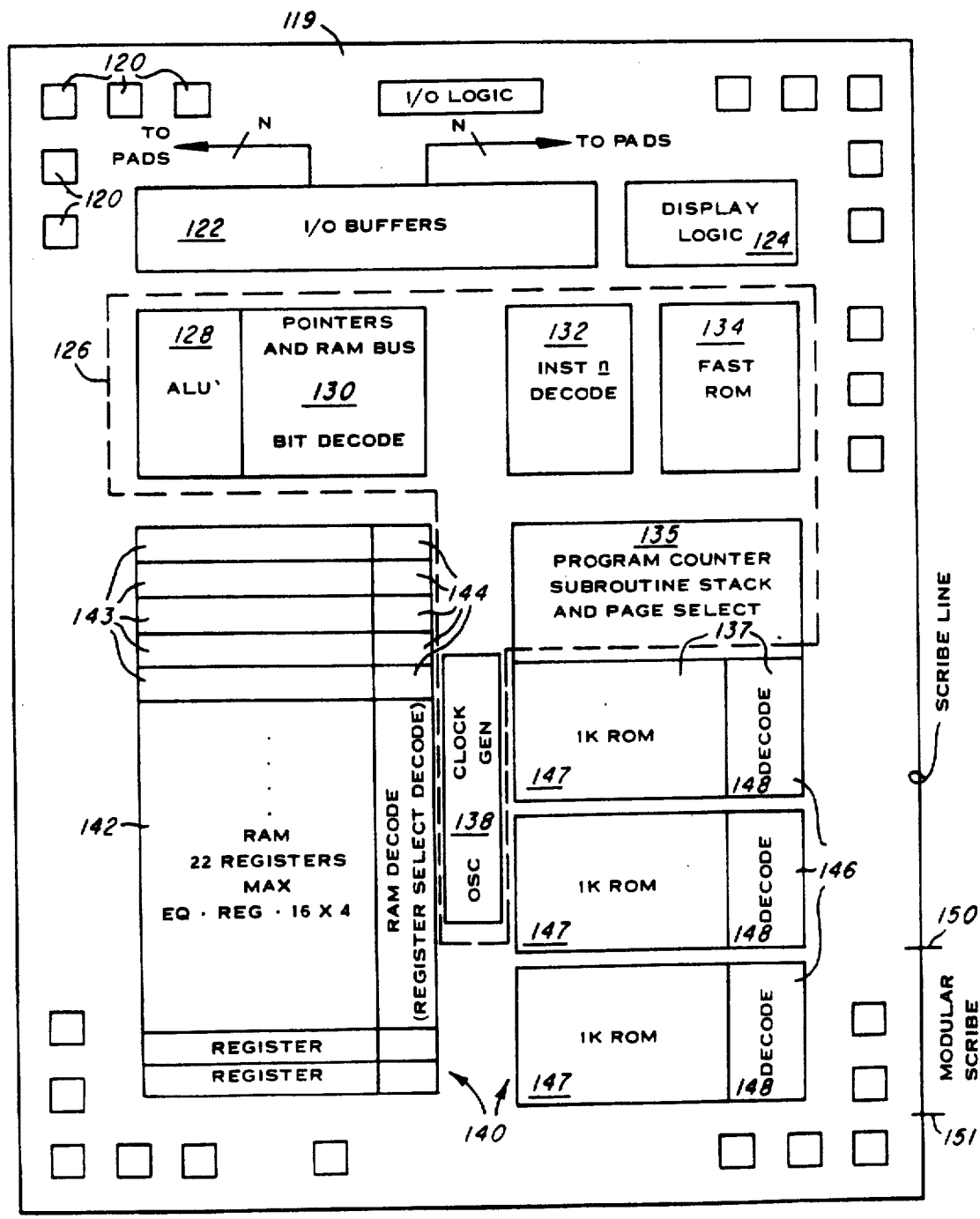
FIGS. 6-8 are bar layout block diagrams of a preferred embodiment of a modular controller integrated circuit of the controller means 30 of FIGS. 4A-D, showing three levels modular layout reduction.

Referring to FIG. 6, a layout block diagram of a preferred embodiment of a modular controller chip of the controller means 30 of FIGS. 4A-D is shown. Bonding pads 120 are distributed along the external periphery of integrated circuit chip 119. A modular input/output buffer and interconnect (I/O) means 122 is laid adjacent a first edge of the integrated circuit chip 119, and is selectively coupled to the bonding pads 120. Display logic 124 provides an additional level of functional modularity to the integrated circuit chip 119 and may be deleted from the layout or left in the design as required by the end application. The display logic 124 provides voltage buffering and timing interface for interconnection of the integrated circuit chip 119 to an external liquid crystal display or other type of alphanumeric or graphic display. A common block of logic forming non-modular circuit group 126 is comprised of fixed circuit function groups for providing data processing and manipulation in accordance with a stored instruction set. The circuit group 126 is comprised of an arithmetic logic unit 128, address pointers, and RAM bus and bit decode circuit means 130, instruction decode circuit means 132, high speed (fast) read only memory (ROM) 134, and program counter, subroutine stack, and page select circuit means 135. A clock generator means 138, although forming a function block of the circuit group 126, may be physically relocated on the integrated circuit chip 119 closer towards the first edge as necessary to accommodate a smaller bar size. In the preferred embodiment, the circuit group 126 is located physically adjacent to the I/O means 122. A partitionable modular memory circuit 140 is physically located adjacent to the circuit group 126 and coupled thereto. Additionally, the memory circuit 140 is physically located adjacent to a second edge of the integrated circuit chip 119 parallel to and opposite from the first edge. In the preferred embodiment, the memory circuit 140 is comprised of a partitionable modular read/write memory circuit (RAM) 142 and a partitionable modular read only memory circuit (ROM) 146. The read/write memory circuit 142 is comprised of read/write memory cells grouped into partitionable registers 143 and register select decode grouped into partitionable decode circuits 144, with each partitionable decode circuit 144 being associated with and adjacent to a partitionable register 143, so as to provide for modular partitionable registers 143 each with its own associated decode 144. The read only memory circuit 146 is comprised of a plurality of memory cells grouped into pages 147 (in the preferred embodiment each page comprising 1024 words), each page being partitionable and independent of each other page, and address decode means partitioned into modular decode circuits 148, each decode circuit 148 being adjacent to and associated with a partitionable page 147 so as to allow addressing of particular locations within the asociated page. The invention may be more easily understood by comparing FIGS. 6, 7 and 8.

Figure 7:
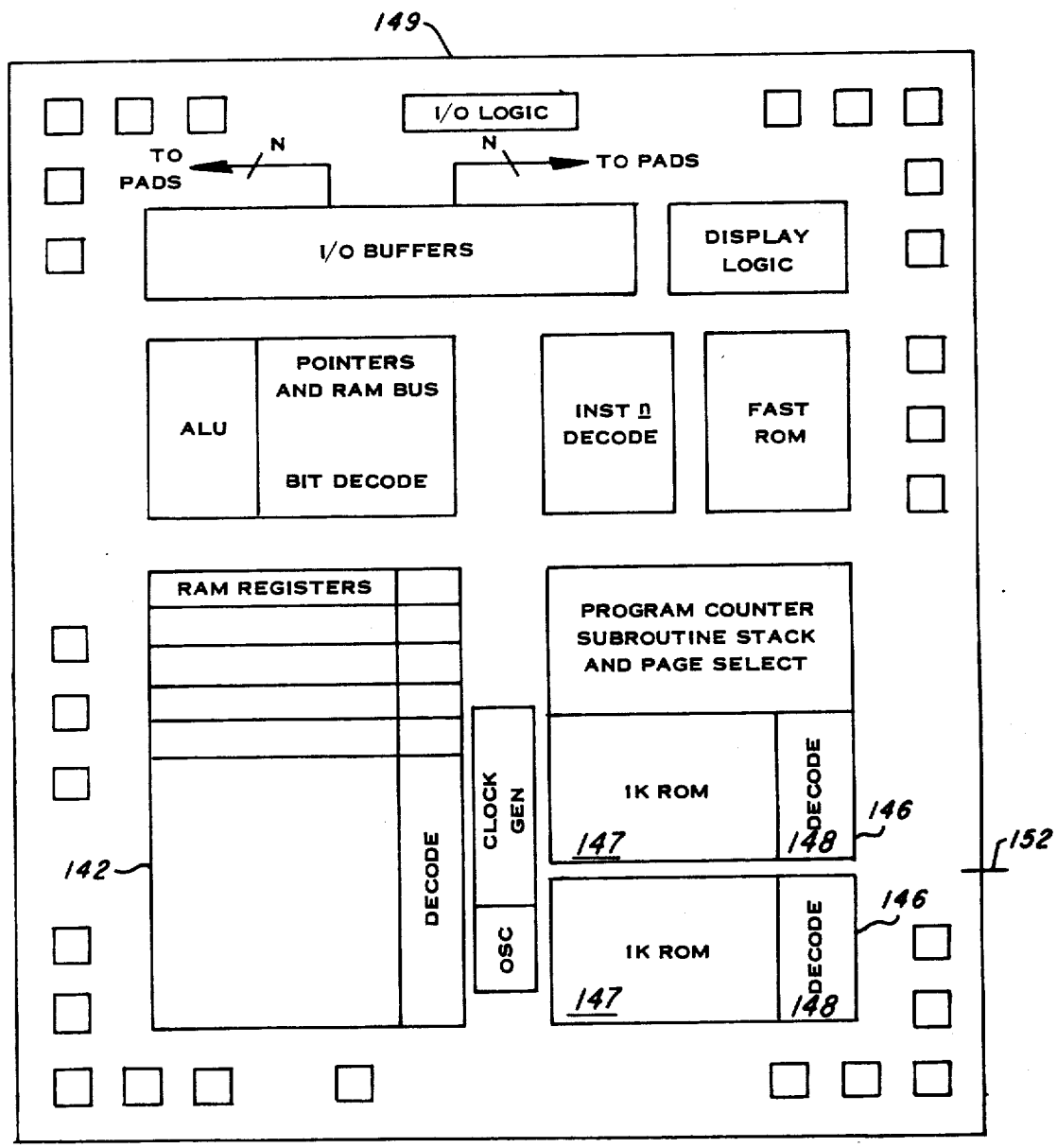

Due to the modular layout and circuit design of the integrated circuit 119 of FIG. 6, partitioned segments of the modular memory means 142 and 146 may be removed from the integrated circuit design bar, substantially without relayout and without circuit redesign of the integrated circuit 119, along the modular scribe lines 150 and 151, and the bar layout compressed so as to result in integrated circuit chip 149 bar layout and design as shown in FIG. 7. As shown in FIG. 7, one page of ROM 147 and associated decode 148, of the read only memory means 146 is removed, and a plurality of registers 143 and associated decode, 144, of the read/write memory means 142 are removed in partitioned groups along the modular scribe lines 150 and 151 as shown in FIG. 6, so as to provide an integrated circuit chip 149, as shown in FIG. 7, identical to the integrated circuit chip 119 of FIG. 6, except for the reduced memory capacity and reduced bar size of the chip 149. Thus, a functionally identical circuit of reduced bar size and reduced memory capacity is provided without necessitating redesign or relayout of the integrated circuit. Thus, the read only memory means 146 may be partitioned to include a minimum number of blocks of read only memory cells required to store the desired instruction set codes with the associated address decode circuit including only a sufficient modular portion to address the minimum number of blocks of read only memory. Furthermore, the read/write memory means 142 may be partitioned to include a minimum number of blocks of memory cells required to store data and the associated address decode circuitry partitioned to include only a sufficient modular portion of address circuitry required to address the minimum number of blocks of read/write memory cells.

Figure 8:
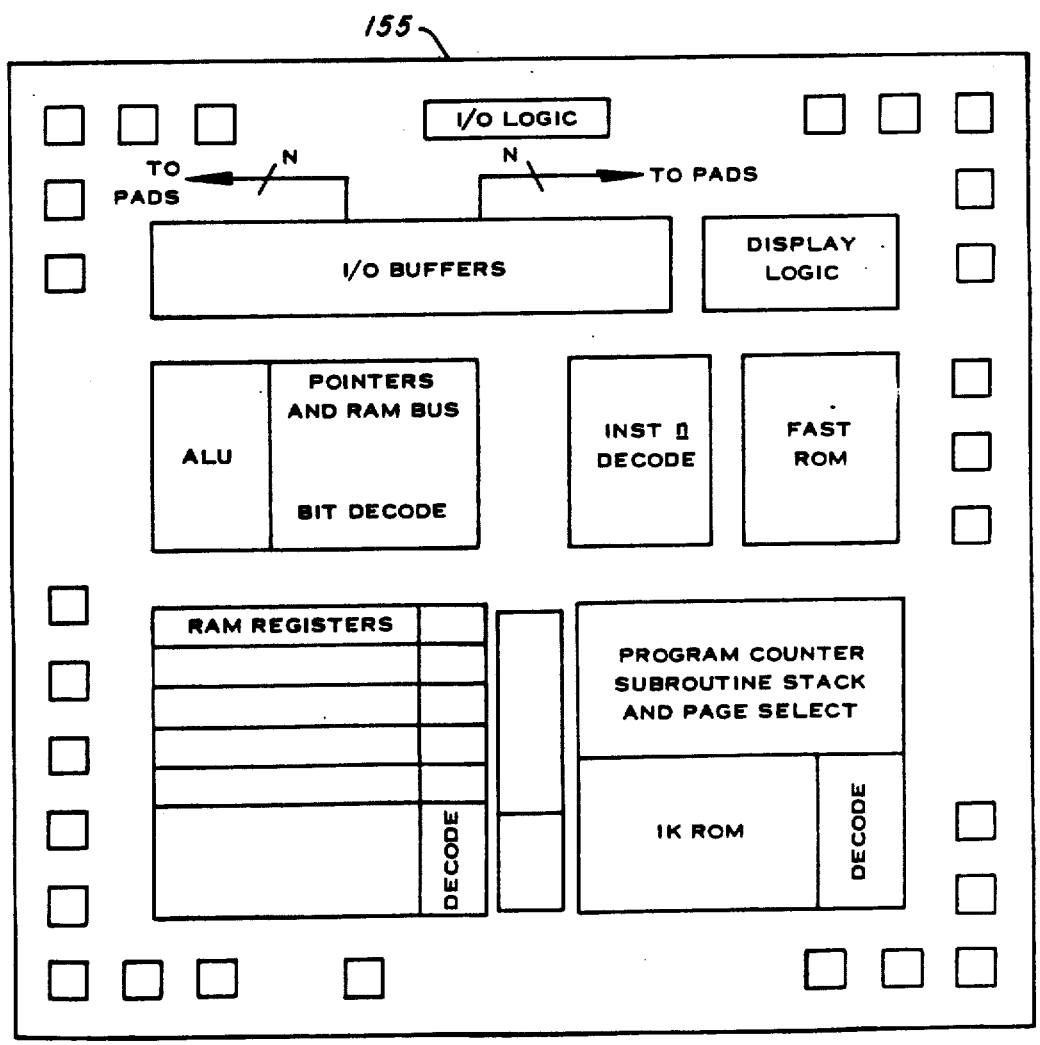

Referring to FIG. 8, a further reduction in bar size and memory capacity of the integrated circuit chip 149 of FIG. 7 is shown in the resultant integrated circuit chip 155. By removing selected modules of the partitioned memory circuit groups of the read only memory means 146 and the read/write memory means 142, in the manner as described above with reference to FIG. 7, but with removal being made along the modular scribe line 152 and of the integrated circuit chip 149, the resultant integrated circuit chip 155 is created without circuitry redesign and essentially without chip relayout (possibly moving bonding pads if so desired) from the integrated circuit chip 149, of FIG. 7. It is also possible to derive the integrated circuit chip 155 of FIG. 8 directly from the integrated circuit chip 119 of FIG. 6. The modular features of the I/O means 122 and display logic means 124 are available and unchanged in the integrated circuit chips 119, 149 and 155, and will be described in greater detail, infra.

Figure 9:
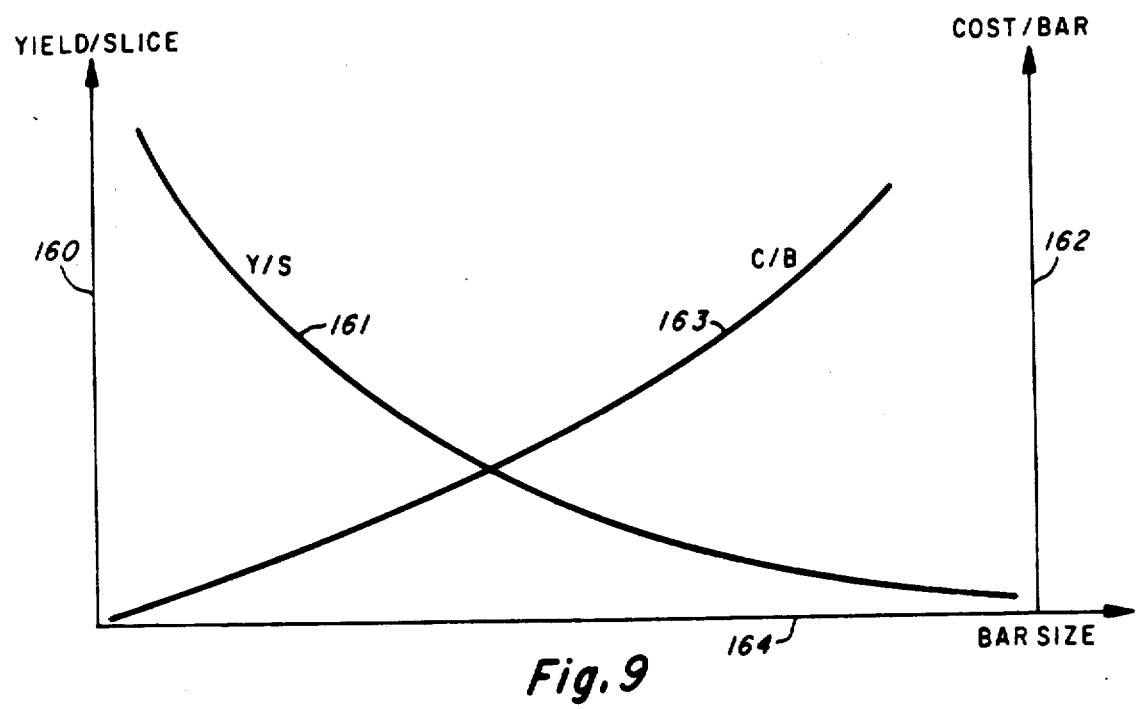
FIG. 9 is a combined axis graph showing yield per slice and cost per bar as plotted against integrated circuit bar size.

Referring to FIG. 9, two of the many benefits derived from the bar modularity as explained with reference to FIGS. 6, 7 and 8 are shown. In FIG. 9, the advantages of optimizing the integrated circuit chip bar size to the application's memory requirements is shown in terms of benefits accruing in yield per slice along axis 160 as shown on curve 161, and as cost per bar along axis 162 as shown on curve 163, both yield per slice and cost per bar being plotted against a common axis 164 of bar size. As shown by curve 161, the yield per slice is inversely proportional to the bar size of the integrated circuits on the semiconductor wafer. As bar size per integrated circuit is decreased, more integrated circuit bars may be placed on a given semiconductor wafer slice, and even assuming a constant yield of bars, the yield per slice in increased. Additionally, as the bar size is reduced, and the complexity of the circuitry and fabrication associated therewith is reduced, the yield of the bars is increased. Referring to curve 163, the cost per integrated circuit chip (bar) is directly proportional to the bar size of the integrated circuit, and therefore optimizing bar size minimizes cost. The bar modularity feature of the present invention allows simplified, interchangeable and quick design turnaround of different memory capacity and specialized function integrated circuit chips with a common circuit group nucleus to be derived from a common circuit design and common bar layout, utilizing a common instruction set, and thereby removes most of the impediments heretofore present in attaining the benefits of optimum bar size for a given appliation. A further benefit of the bar modularity is reduced cost per bar from a separate phenomenon in the semiconductor industry known as the learning curve as applied to semiconductor manufacture.

Figure 10:
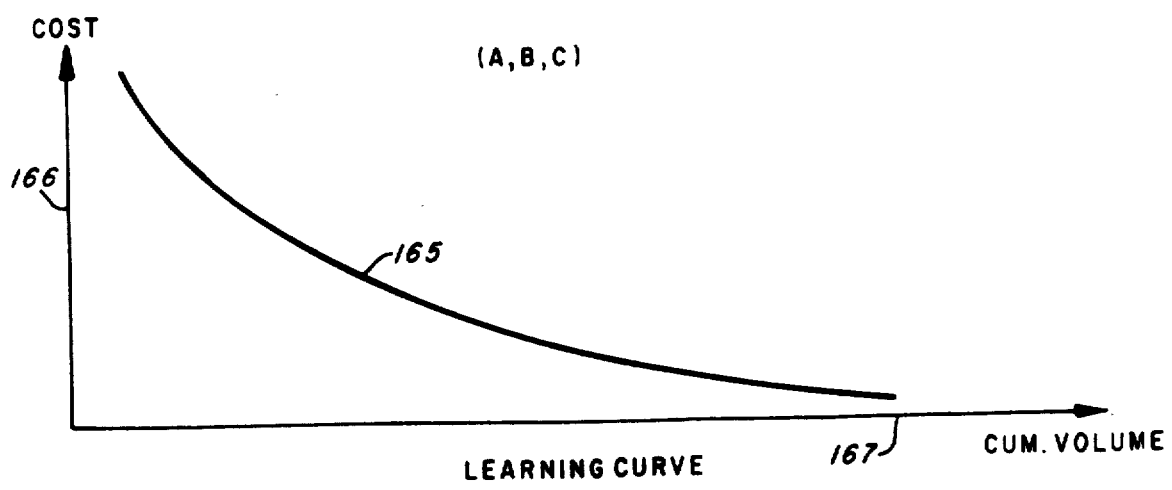
FIG. 10 is a plot of cost v. cumulative volume, showing the semiconductor learning curve as applied to the integrated circuit designs of FIGS. 6-8.

Referring to FIG. 10, a semiconductor learning curve 165 is shown as plotted against cost on the vertical axis 166 and cumulative volume on the horizontal axis 167, the horizontal axis being logarithmically scaled. The integrated circuit chips 119, 149 and 155 are derivable from the bar modularity invention, and all share a common bar layout, a common circuit design, and common processing. The manufacturing volume of each of the integrated circuit chips within the bar modularity chip set are additive in forming a combined cumulative volume to drive the cost down the learning curve at a faster rate than attainable as to any of the integrated circuit chip bars standing alone.

A method of manufacturing a modular integrated circuit as described with reference to FIGS. 6, 7 and 8 may be better understood with reference to the flow chart of FIG. 11. First, a first circuit means for providing permanent electronic circuitry is patterned on a replica of a integrated circuit to be manufactured. The first circuit means includes the program counter, subroutine stack, instruction decode array, arithmetic logic unit, memory pointers, accumulator, oscillators and clock generators, and a permanent section of read/write and read only memory. This first circuit means forms the central module for all versions of the modular integrated circuit. Next, a second circuit means is patterned on the replica of the integrated circuit in the form of at least two electronic circuit modules. The second circuit means includes control word storage in a read only memory, and data storage in a read/write memory, each forming separate partitioned memories, but both being integral sections of the integrated circuit. Next, the electronic circuitry of the first circuit means and the modules of the second circuit means are electrically interconnected on the replica of the integrated circuit so that any or all of the modules may be removed without destroying the functioning of electronic circuitry or of the remaining modules. In the preferred embodiment, the modules of the second circuit means are physically positioned on the replica with respect to other modules of the second circuit means and the electronic circuitry of the first circuit means, so that any or all of the modules may be removed without necessitating relayout and such that the resulting layout produces a minimally size integrated circuit bar. Next, the non-desired modules are removed from the replica in accordance with the minimal memory requirements of the application and the special function reguirements of the application to achieve an optimal amount of circuitry. Next, one of several options for alternative embodiments may be chosen. In one embodiment, the next step after the step of removing the desired modules is to replace the removed modules with other desired functional modules. In an alternative embodiment, the next step after the step of removing the desired modules is to pattern on the replica a pinout definition means, connected to the first circuit means, for changing the integrated circuit pinouts according to a pinout definition matrix so that the pinout of the integrated circuit may be redefined without destroying the functioning, patterning, or positioning of the first circuit means and the second circuit means, followed by the step of patterning the pinout definition matrix according to the desired pinout. Alternatively, both of these steps may be taken. The next step, in any event, is the step of reducing the replica in size proportionally with the size of the removed modules so as to provide a minimal bar size and an optimal design. Next, the replica in its desired form is transformed into the desired integrated circuit. This may be done by a number of methods, such as generating a mask set from the replica in its desired form, processing a semiconductor slice using this mask set, and packaging and testing the resultant integrated circuits.

The first circuit means includes block decode means for selectively providing an output to a selected one of the memory modules in the second circuit means in response to receiving a memory address, wherein the selected memory module outputs a stored data word which is coupled to the first circuit means in response to receiving the output from the block decode means. Furthermore, the second circuit means may be partitioned such that removal of individual ones of the blocks of the partitioned memory modules reduces the memory storage capacity of the integrated circuit in predefined modular blocks. One page or 1024 words of read only memory, and seven registers of read/write memory form a partitionable block of the memory in a preferred embodiment.

Figure 11:
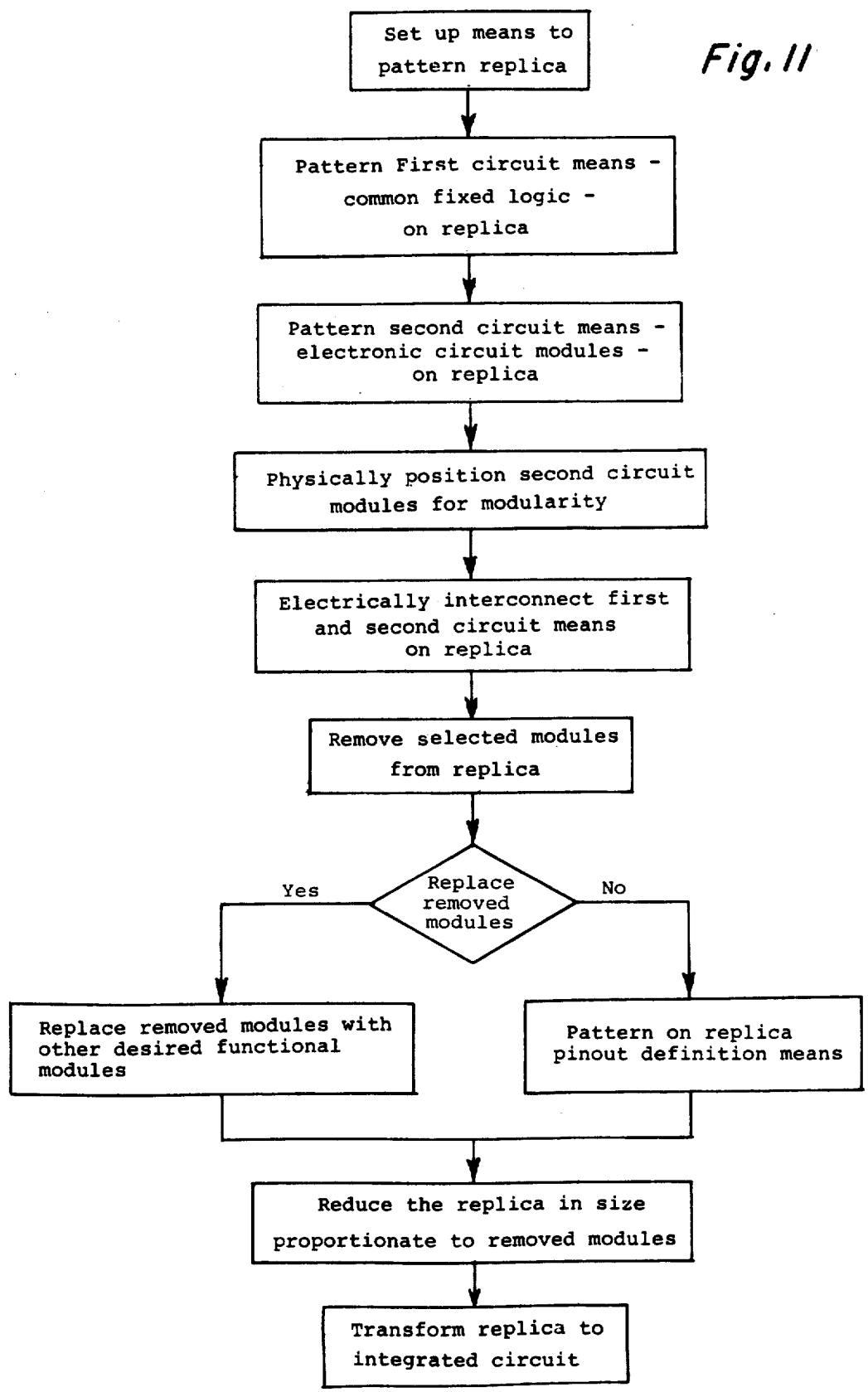
FIG. 11 is a flow chart showing a method of manufacturing a modular integrated circuit as described with reference to FIGS. 6-8.

The manufacture of the modular integrated circuit is accomplished, in a preferred embodiment, by an automated data processing machine having input thereto representing circuit topology and initial values of all design variables data for wherein each of the steps as described with reference to the flowchart of FIG. 11 are generated and stored in the data processing machine. This includes the steps of generating and storing first circuit means for providing permanent electronic circuitry; generating and storing second circuit means in the form of at least two electronic modules; generating and storing electrical interconnect of the modules in the electronic circuitry so that any or all of the modules may be removed without destroying the functioning of the electronic circuitry and of the remaining modules; positioning the modules with respect to the electronic circuitry of the first circuit means so that any or all of the modules may be removed independent of the first circuit means and independent of the remaining modules; removing the desired modules from storage; reducing the stored circuit representation in size proportionally with the size of the removed modules; and transforming the stored representation in its desired form into an integrated circuit. Additionally, the alternate embodiments as described with reference to FIG. 11 may also be utilized in conjunction with the automated data processing machine. Furthermore, modular functional blocks may be stored in the automated data processing machine for recall and positioningg in accordance with the desired application.

Utilizing the modular integrated circuit as described above, a modular system result as described with reference to FIGS. 4A-D is achieved.

Referring to FIGS. 12A-B, a block diagram of a modular I/O design for the controller integrated circuit 30 of FIGS. 4A-D is shown.

A solution of the problem of rigid I/O design fixed to optimize each product is to provide a modular I/O design. First, each I/O buffer 220-223 is treated by the logic of the controller integrated circuit as an addressable element of memory (memory bit). The I/O buffer can then be addressed and either written into or read from using memory compatible instructions and hardware. Next, each buffer is provided with its own associated memory address decode 225-228. This allows a common address bus 212, data bus 213, control and clock lines 211 and power buses, 214 and 215, to be coupled in parallel to each of the I/O buffer locations. Each buffer has its own associated address decode which individually decodes its own predefined select address, and is selectively either written into or read from. This eliminates the need for special select and control lines for each of the buffers. In one embodiment of the invention, no change of the interconnect between the buffers and associated decode or between the buffers and bonding pads, or between the memory mapped I/O bus and the address decode is required to reconfigure the buffer functions and therefore the pinout. When a first buffer is the same as a second buffer, then simply reprogramming the decode address of the address decode associated with a particular buffer redefines the function of the buffer and the pinout associated therewith. Alternatively, the separate address decode associated with each of the first and second buffers may be swapped, that is be physically interchanged, so as to be associated with the second and first buffer, respectively, retaining the same program decode address.

In a preferred embodiment, the I/O data bus is run along one edge of the semiconductor bar and all buffers and associated decode are placed along a straight line beneath and coupled to the I/O data bus as shown in FIGS. 6-8. A metal interconnect is made from each of the buffers to the corresponding bonding pad. This provides the option of not having to physically remove a buffer and associated decode to a new bonding pad location in order to couple that buffer and associated address decode to that bonding pad. The address decode interconnect modularity permits the change of bonding pad functions between any two like species of buffers, for example between two select line buffers, and may be done by changing only the hardware programmable address at the buffer address decode. However, to exchange the coupling arrangement between two different species of buffers and associated bonding pads, for example, swapping a K line with a select line, would require physically removing and relocating the buffers. In a further embodiment as described with reference to FIGS. 13A-B, only reprogramming an interconnect contact matrix so as to couple the metal interconnect from the desired buffer to the desired metal line coupling to the desired bonding pad is required. Although the I/O buffers may be designed so that each one may be programmed for a different function, in the preferred embodiment, each buffer has a specific function, so as to achieve optimal system circuit design. In the preferred embodiment, there are discrete function buffers for I/O functions, input functions, and K lines or select lines. In an alternate embodiment, one general purpose buffer may be provided which fulfills all the functions that are required by the system. However, this general purpose buffer would be physically larger than the largest function buffer used. This would allow the hardware programmable address feature of the buffers to accomodate complete changes of bonding pad functions irrespective of the particular species of function to be output, without any hardware metal interconnect changes and in fact without any interconnect contact matrix in the preferred embodiment, and without any buffer relocation in the one embodiment. However, by optimizing buffer size for each function, more buffers may be fitted in a given area or semiconductor bar. However, if all the buffers are made general purpose and the same size, then there is no limit as to total pin-out change simply by reprogramming the programmable address decode associated with the buffers. The choice of approach, the one embodiment, the preferred embodiment, or the alternate general purpose buffer embodiment, is dependent upon the designers objectives and the system requirements.

Referring to FIGS. 12A-B, each I/O buffer, 220-223, is treated by the logic of the integrated circuit as an addressable element of memory (memory bit). The I/O buffer is addressed and either written into or read from as a memory location. Next, each buffer 220-223 has its own associated memory address decode 225-228. This allows common address, data, and control and clock line busses 210 to be coupled in parallel to each of the I/O buffers 220-223 locations, where each buffer's associated address decode circuit individually decodes its own predefined selected address, and is selectively either written into or read from responsive to the command and data codes. This eliminates the need for special select and control lines for each of the buffers. With the present invention, only an address bus 212 and data bus 213 are required to be coupled to the buffers and associated decode logic, and a common address/common data bus may be utilized. To address 16 I/O buffers with the present invention, only four address lines are required for selection of one of the 16 buffers. A key additional advantage to the present invention is that it makes any I/O change easy to implement. That is, it does not matter where the buffer is located along the general purpose data bus. Thus, any individual buffer with its associated address decode can be physically located at any location along this address/data bus, and there is no necessity to relayout the select/control lines specific to each individual buffer when changing pin-out. Thus, the present invention makes any I/O reconfiguration a minimum design change which can be easily accomplished either manually or with the assistance of digital layout programming techniques. The buffers with associated address decode along a common address/data bus provides for a memory mapped I/O system with self address decode capability associated with each buffer. Thus, in one embodiment, no change of the interconnect between the buffers and associated decode or between the buffers and the bonding pads, nor between the associated decode and the memory mapped I/O bus is required to reconfigure the buffer functions and therefore the pin-out. To reduce bar layout complexity and bar size area, the address and data lines may be multiplexed together on a common bus coupled to the buffers and the address decode associated therewith. This results in fewer required lines in the I/O bus 210. When a first buffer is the same as a second buffer, then simply reprogramming the decode address of the address decode associated with a particular buffer redefines the output of the buffer and the pin-out associated therewith. Alternatively, the address decodes associated with each of the first and second buffers may be swapped, that is be physically interchanged, so as to be associated with the second and first buffer, respectively, with the address decodes retaining the original program decode address. Alternatively, if it is desired to retain the same address decode location with a different type of buffer, the buffer is replaced or swapped with a buffer of the desired type, and coupled to the original address decode and to the bonding pad to which the replaced buffer was associated with. By this method, optimal buffer size is achieved, while retaining I/O modularity and pin-out definition modularity. In a preferred embodiment, as described with reference to FIGS. 13A-B, a programmable interconnect contact matrix 245 is interposed between the outputs of the buffers 220-223 and the metal lines 234-237 coupling to the bonding pads 230-233. Thus, by providing a particular matrix program for the interconnect matrix 245, the coupling of the output from the buffers to the bonding pad locations which couple to the external coupling means to form the external pin-out may be modified independently of the buffer locations or the selected address decode for any given buffer.

Referring again to FIGS. 12A-B, in one embodiment of the invention, the I/O bus 210 is distributed around the whole perimeter of the integrated circuit bar, and each individual buffer 220-223 and associated address decode 225-228, is located adjacent to and coupled to a respective bonding pad 230-233. The address to which each buffer 220-223 will respond is controlled by programming a selected address into the associated address decode 225-228 by hardwire programming, such as via gate, moat, or metal level masks during processing, via ion implants, or via electrical programming after completion of processing. In order to change the association of a particular buffer and associated decode with a particular bonding pad to be associated with a different bonding pad, the particular buffer and associated address decode must be physically relocated adjacent to the different bonding pad to which it will be coupled, and the address decode logic must be selectively programmed to respond to the newly selected desired address.

In a preferred embodiment of the present invention, the I/O data bus 210 is run along one edge of the semiconductor bar as shown in FIGS. 6-8, and all buffers 220-223 and associated decode 225-228 are placed along a straight line beneath and coupled to the I/O data bus 210.

Figure 13A:
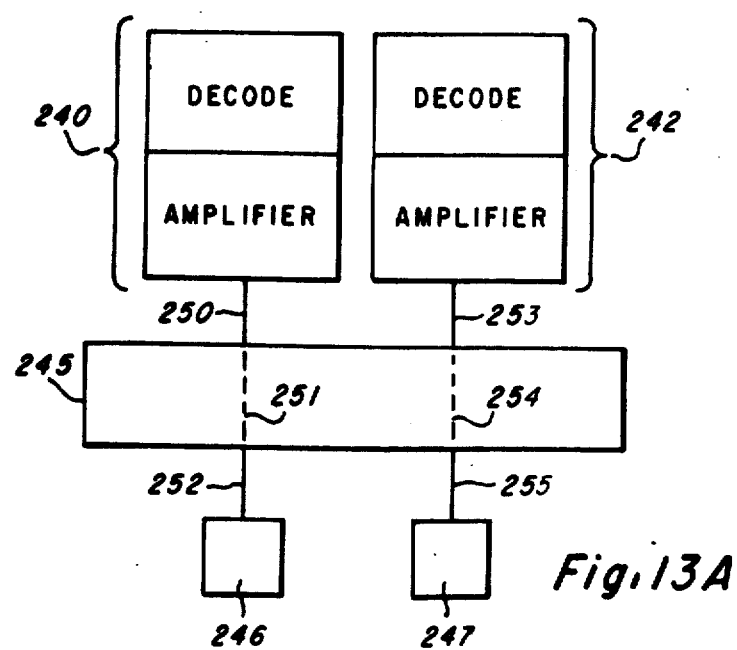

Referring to FIGS. 13A-B, the metal interconnect 234-237 from the buffers 220-223 to the desired bonding pad 230-233, respectively, of FIGS. 12A-B, are functionally replaced by an equal number of programmable interconnects, such as 251 and 253, of a programmable interconnect contact matrix 245 as shown in FIG. 13A. This provides the option of not having to physically remove a buffer and associated address decode and physically relocate the buffer and associated decode to a new bonding pad location in order to couple that buffer and associated address decode to the new bonding pad. Rather, by varying the selected pattern of the interconnect contact matrix 245, for example, by means of hardwire programming (such as gate or metal level mask programming during processing, ion implant, by post assembly electrically programming, or by other programming means), selective coupling between the outputs of the buffers 220-223 and the bonding pads 230-233 of FIGS. 12A-B is accomplished without physical relocation or relayout of the semiconductor bar, and without reprogramming the associated address decode circuits 225-228. Metal lines 234-237, each an output from a respective buffer 220-223, are coupled to a respective location in the matrix 245, and an equal number of metal lines are output from the matrix 245 each coupling to a bonding pad 230-233. The chip designer may select an individual buffer and program the metal connection via the interconnct contact matrix 245 out to a particular metal line coupling to a particular bonding pad. For example, referring to FIG. 13A, assume it is desired to change the functions served by a bonding pad 246, which was an input buffer 240 function (KC), to an output buffer 242 function (R4) select which was coupled to bonding pad 247, pads 246 and 247 being adjacent one another. Two metal lines, 252 and 255, physically located adjacent one another, are run along the one edge of the bar adjacent to the I/O buffer arrays 240 and 242. The metal connects, or coupling means, 251 and 254, from the outputs of the KC buffer 240 and the R4 select buffer 242 must be changed to couple with the desired bonding pad metal lines to achieve the functional swap. The address decode I/O modularity permits the change of bonding pad functions between any two like species of buffers, for example between two select line buffers, and may be done by changing only the hardware programmable address at the buffer address decode. However, to exchange the coupling arrangement between two different species of buffers and associated bonding pads, swapping the KC line with the R4 select line, would require physically removing and relocating the buffers with the address decode I/O modularity scheme. In the preferred embodiment, only reprogramming the contact matrix 245 so as to couple the metal interconnect from the desired buffer to the desired metal line coupling to the desired bonding pad is required. Although the I/O buffers may be designed so that each one may be programmed for a different function, in the preferred embodiment, each buffer has a specific function so as to achieve optimal system circuit design. In the peferred embodiment, there are discrete function buffers for I/O functions, input functions, and K lines or select lines. In an alternate embodiment, one general purpose buffer is chosen which would fill all the functions that are required by the system, although the buffer would have to be physically larger than the largest function buffer used. This allows the hardware programmable address decode feature of the buffers to accomodate complete changes of bonding pad functions irrespective of the particular species of function to be output, without any hardware metal interconnect changes (thus obviating the need for the interconnect contact contact matrix 245 in this embodiment), and within any buffer relocation required as in the special purpose buffers embodiment. However, by optimizing buffer size for each function, more buffers may be fitted in a given area of semiconductor bar. For example, a select buffer is much wider (approximately 5 to 10 times wider) than a K buffer. If all of the buffers were general purpose multi-function buffers, then each buffer for the K-function would be 5-10 times larger than that required for the specific application, and consequently, the design would be limited as to how many output buffers could be placed within the allowable area of the semiconductor. However, if all the buffers are made general purpose and the same size, then there is no limit as to total pin-out change simply by reprogramming the programmable address decode associated with the buffers. The choice of approach is dependent upon the design objectives and the systems requirements, and the advantages and disadvantages of each approach must be analyzed for each project.

Referring to FIG. 13B, the programmable interconnect matrix is comprised of a pin-out definition means 202. An interconnect coupling means includes bonding pad means 207 having individual bonding pads 230-233, for providing interconnection to conductors 209 external to the integrated circuit so as to define a pin-out for the integrated circuit. An interconnect contact means includes amplifier means 205 and logic means 203 for coupling the first circuit means 200 to the bonding pad means 207. A programmable interconnect (such as a programmable mask level during processing or electrical programming after manufacture) couples outputs from the first circuit means 200 to individual bonding pads 230-233 of the bonding pad means 207 according to the programmed state of pin-out definition matrix means within the pin-out definition means 202.

Referring to FIG. 14, a block diagram of a preferred embodiment of the memory I/O in a modular controller integrated circuit of the present invention is shown. A plurality of R/select line outputs 300 are used either to drive a one fourth duty cycle liquid crystal display, for keyboard scan, or for communication. A plurality of K line inputs 310 are utilized for keyboard scan, or for communications input from a source external to the integrated circuit. In the preferred embodiment, four of the bit lines are used as multiplexed test outputs. A plurality of common lines 320 function as inputs or outputs. In the preferred embodiment, four common/test input lines are used either to drive an externally coupled liquid crystal display, or may be used to receive input addresses for coupling to the main program counter or instruction decoder of the controller chip. A plurality of dedicated test inputs 315 may be provided, the preferred embodiment utilizing four dedicated test inputs.

At least one print I/O communications line 324 is provided in the preferred embodiment. A plurality of bidirectional input/output lines 330, I/O 1, 2, 4, 8 in the preferred embodiment, provide for bidirectional communication to a source external to the integrated circuit such as separate RAM, ROM or peripheral integrated circuits as shown in FIGS. 5A-C. In the preferred embodiment, the address decode logic, as shown in FIGS. 12A-C, are designed so as to be responsive to RAM register locations greater than 23. Of course depending on the number of RAM registers used in the controller, and upon the bus architecture utilized in the controller, other addressing schemes of the address decode logic is possible. In the preferred embodiment, the associated address decode forms a part of the select/R lines 300, the common lines 320, the K lines 310, the print I/O lines 324, the I/O lines 330, and timekeeping means 350. Each associated address decode is coupled to an internal I/O bus 335 corresponding to the control bus 210 of FIGS. 12A-B. The I/O bus 335 is comprised of a Memory Address X/Multiplexed Common Line bus 340, corresponding to bus 217 of FIGS. 12A-12B; a Data bus 341 corresponding to the Data bus 213 of FIGS. 12A-12B; a Timing and Control bus 342 corresponding to the bus 211 of FIGS. 12A-B; a Memory Address Z bus 343 corresponding to the bus 216 of FIGS. 12A-B; and a display and power voltage bus 344, corresponding to busses 214 and 215 of FIGS. 12A-B. Additionally, in the preferred embodiment, fixed logic blocks and modular logic blocks coupled to the I/O bus include the timekeeping logic 350 and associated decode 360, as shown in greater detail in FIG. 17 and FIGS. 18A-G. The I/O bus 335 is coupled to a plurality of modular circuit blocks and fixed logic circuit blocks comprising interface means for bidirectional communication between the processor portion of the controller integrated circuit and the I/O bus 335.

An I/O oscillator 370 provides an output coupled to an I/O clock generator 372 which provides a first output to a display voltage generator 374 and provides a second output to the clocking and control logic 376. The clocking and control logic 376 provides a plurality of timing and control outputs, coupled to the timing and control bus 342, responsive to receiving the second output from the I/O clock oscillator 372 and to receiving a processor clock input 377. The I/O oscillator 370 is, in the preferred embodiment, an RC controlled oscillator output operating at a nominal 32 KHZ. The oscillator 370 is coupled to and drives the I/O clock oscillator 372 independent of and asynchronous to a main processor oscillator within the processor portion of the controller integrated circuit. Independence from the main oscillator yields considerable power savings in a display only mode wherein only the I/O oscillator and display circuitry is active, as described in greater detail in U.S. Pat. No. 4,317,181, Four Mode Microcomputer Power Save Operation. The machine state control latches 371 are also described in greater detail therein. An oscillator which is compatible with the present invention is described in greater detail in copending application Ser. No., 130,299, filed Mar. 3, 1980, CMOS Frequency Divider Circuit.

The I/O clock generator 372 divides the received output from the I/O oscillator 370 to generate multiphase I/O clocks at different frequencies. In the preferred embodiment, the I/O clock generator 372 provides a two phase I/O clock at 8 KHZ and at 500 HZ, providing pulses suitable for shifting the common time generator 373 of the common time generator and multiplexor logic 400, every two milliseconds. The I/O clock generator 372 also provides an output which, in the preferred embodiment, generates a 125 ms pulse every third common time which may be used to provide for rapid hardware keyboard interupts via the select/R lines 300. This output may be coupled to the display voltage generator 374 so as to allow the hardware keyboard interupts to affect all display segments of the external display identically.

Figure 16A:
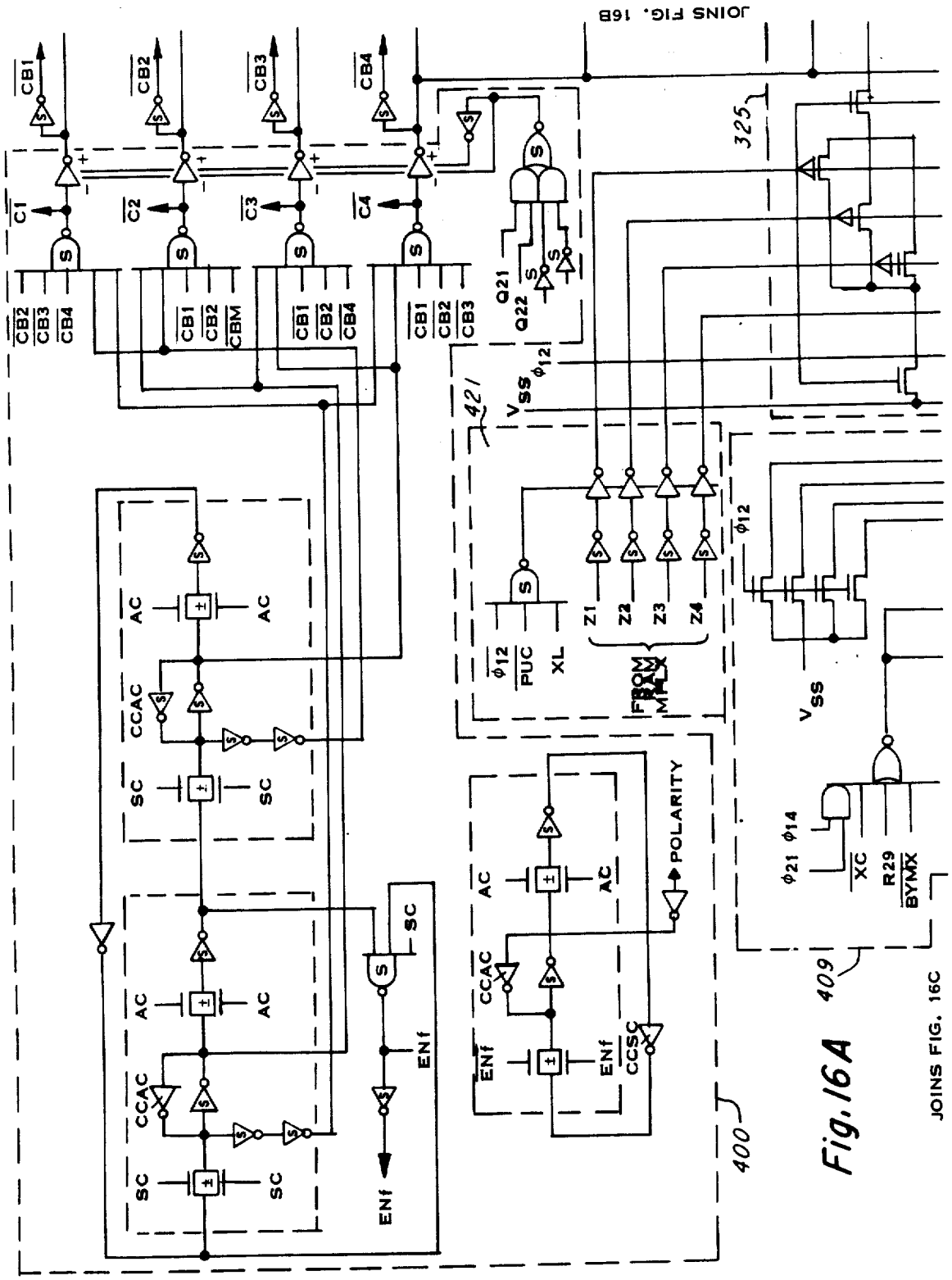

The common time generator and multiplexor logic 400 is shown in greater detail in FIG. 16A. The common time generator 373 and multiplexor 375 form a two bit shift counter in the preferred embodiment, having four states which correspond to the four common times of the system. The counter shifting rate is selected via the multiplexor 375 responsive to the outputs from the machine state control mode latches 371, so as to shift at a display rate of two milliseconds, or at the processors internal instruction cycle rate, 15 microseconds in the preferred embodiment. The common time generator 373 provides a plurality of outputs coupled to the select data latches 405 and a buffer 407. The outputs from the buffer 407 are coupled to the memory address X bus/common bus 340. The X Decode Programmable Logic Array (PLA) 410 in the preferred embodiment encodes a five bit RAM X register address received from the processor portion of the controller integrated circuit into a memory address x bus 340 compatible output so as to select a particular addressed buffer along the I/O bus 335. In the preferred embodiment, the PLA 410 provides active decode only for X addresses greater than 11000, (base 2). The output of the PLA 410 is coupled to an isolation buffer 411 which provides an output coupled to the memory address X bus 340.

Select data latches 405 are comprised of a plurality of single bit latches which store character data to be clocked into the select buffers 300. This data is received from the processor portion of the controller integrated circuit via the processor's internal data busses x and y when the latches are selected by the common time generator 373. The concept of multiple internal processor data busses is described in greater detail in copending application Ser. No. 196,829, Data Processing System Having Multiple Buses, and in copending application Ser. No. 196,808, Multiple Memory Pointer System, both filed Oct. 14, 1980. The select data latches 405 replace the conventional output programmable logic array. Character data may be stored in a look up table coded into a series of instructions in the instruction's immediate fields within the main read only memory of the integrated circuit. Only the data required for a particular individual display requirement is stored, and may be changed with a change in ROM code. The data outputs from the select data latches 405 are selectively strobed from the latches 405 responsive to the output received from the common time generator 373, in proper sequence to the select/R buffers 300 and stored in the four bit latch 301 of the select/R buffers 300, coupled via the data bus 341. Additionally, the data bus 341 is coupled to a bidirectional buffer interface 409 to one of the internal data busses from the processor portion of the controller integrated circuit. An anykeys latch 420 is coupled to the outputs from the X decode PLA 410 and to an output from a buffer 421 which couples a signal from the processor's multiplexed PZ address bus. The anykeys latch 420 may be a hardware or software controlled latch which causes all select/R line 300 outputs to be coupled to a first supply voltage, VDD in the preferred embodiment, when the anykeys latch 420 is set. The anykeys latch 420 may also enable the K-line 310 pull down transistors to activate. In the preferred embodiment, the anykeys latch is only set during a process and display mode. In general, the anykeys latch 420 is set and reset in response to predefined set and reset instruction execution. An output from the anykeys latch 420 is coupled to the display voltage generator 374.

The display voltage generator 374 is coupled so as to receive inputs from the machine state mode control latches 371, the common time generator 373, the anykeys latch 420, and the I/O clock generator 372. The display voltage generator 374 provides outputs coupled to the display voltage bus 344. In essence, the display voltage generator 374 serves two purposes:

(1) to generate the multiple voltage reference outputs (VDD, $\frac{2}{3}$VDD, $\frac{1}{3}$VDD, and VSS, in the preferred embodiment) as required for one fourth duty cycle operations; and (2) to switch the liquid crystal display drive voltage busses 344 between the voltage references and to supply a nominal 62.5 HERTZ AC waveform with a zero volt DC offset voltage for coupling to the liquid crystal display. Intermediate voltages may be generated via passive resistor divider chains, as shown in greater detail in FIG. 21. A low impedance divider chain may be used for the first five percent of each common time when the display voltages are changing, after which time a high impedance chain may be used to hold steady the voltage level, in the preferred embodiment.

The clocking and control logic 376 is coupled so as to receive inputs from the I/O clock generator 372 and from the processor clock bus 377 from the processor portion of the controller integrated circuit.

The clocking and control logic 376 generates various timing and control signals so as to enable to the processor portion of the controller integrated circuit to synchronously interface with the I/O portion for communication. The clocking and control logic 376 may also selectively activate desired sections of the I/O portion of the integrated circuit so as to force those sections to become static combinational logic when the processor is inactive, responsive to the outputs from the control latches 371, thereby allowing the I/O to display information when driven only by the common time generator 373 (as described in greater detail in U.S. Pat. No. 4,317,180, Clocked Logic Low Power Standby Mode.

In a preferred embodiment, the I/O bus 335 is comprised of four Data Lines comprising the data bus 341; four Memory Address X/Common Lines comprising the X/common bus 340; four PZ lines comprising the PZ bus 343; six clock/control lines comprising the Timing and Control bus 343; four Display Voltage lines comprising the Display Voltage bus 344; and two power lines forming a main power bus. Each buffer, set of buffers, or special circuit coupled to the I/O bus 335 includes individual address decode circuitry so that each individual buffer or special circuit decodes its own address directly off the I/O bus 335, which may use a noncomplementary signal decoder as described in copending application Ser. No. 154,339, filed May 29, 1980, Address Decode System, or through any other type of address decode means. This feature of individual address decode being associated with each buffer or special circuit facilitates changing buffer address or buffer location by simply changing the hardware address decode circuitry. In the preferred embodiment, the hardware address decode is programmable, either during processing via ion implant, via metal mask, gate mask, moat mask, or a combination thereof, or after processing via electrical programming.

The data bus 341 as shown in greater detail in FIG. 16C, is a bidirectional multibit bus. In the preferred embodiment the data bus 381 is a four bit bus. Data transfer to and from the buffers coupled to the bus 335 and to the processor's internal bus occurs via the data bus 341. In the preferred embodiment, the processor internal bus may be a particular one of a plurality of internal processor busses as described in copending application Ser. No. 196,829, Data Processing System with Multiple Buses and Application Ser. No. 196,808, Multiple Memory Pointer System, both filed Oct. 10, 1980.

The PZ address bus 343, as shown in greater detail in FIG. 16C, couples a memory address received from the processor to an individual buffer coupled to bus 335, where it is decoded. In the preferred embodiment, the PZ address bus 343 is coupled to the processor's four bit RAM word address as output from the multiplexed PZ address buffer 421, as shown in detail in FIG. 16A.

The Memory Address X/Common line bus 340 as shown in greater detail in FIGS. 16C and 16D, is a uni-directional bus which serves multiple purposes. In the preferred embodiment, the memory address x/common bus 340 is a four bit unidirectional bus which serves four purposes. First, when the processor is communicating with the I/O section, encoded register data is output from the X decode PLA 410, as shown in greater detail in FIG. 16D, is coupled to the memory address X/common bus 340 for coupling to the selected individual buffers for decoding during the first half of the processor's instruction cycle. Second, when the processor is communicating with a Select/R buffer 300, so as to load R line data, timing signals are carried to the Select/R buffers 300 so as to strobe data into the 4-bit latch 301 during the second half of the processor's cycle. Third, while the calculator system is displaying information, the common time generator 373 utilizes the Memory Address X/Common bus 340 to couple strobe outputs to the common buffer 320 to couple data to the display while simultaneously strobing the proper data from the four bit select latches 301 to the select/R buffers 300 and therefrom to the external system. Fourth, and finally, when the processor is loading select data from an internal bus of the processor via the select data latches 405 or via the bus transceiver 409, the common time generator 373 utilizes the Memory Address X/Common bus 340 to strobe data from the data bus 341 into the proper bit of the four bit latch 301 via one output of the select/R buffers 300.

The timing and control bus 342, as shown in greater detail in FIG. 16C, is comprised of various clock and control signals needed to execute addressing, data transfer, and read/write operation of the buffers coupled to the I/O bus 335. The display voltage bus 344, as shown in greater detail in FIG. 16B, in the preferred embodiment, couples four time varying waveforms as output from the display voltage generator 374 to the common buffers 320 and to the Select/R buffers 300 so as to properly multiplex a one fourth duty cycle liquid crystal display. The unique features of the display interface and utilization of the display voltage bus 344 are described in greater detail in copending application Ser. No. 168,853, filed July 14, 1980, A Data Processing System Having Dual Output Modes.

The common buffers 320 are coupled to bus 335. The common buffers 320 couple switched time varying waveforms to the back-plane of a liquid crystal display at a frequency determined by the common time generator 373.

The select/R buffers 300, as shown in greater detail in FIGS. 16C and 16D, are coupled to the I/O bus 335. The select/R buffers 300 couple switched time varying waveforms to a front-plane of a liquid crystal display synchronous with the common time rate so as to effectuate a visible display of desired data on the liquid crystal display. Individual segments of the liquid crystal display are turned on or off depending upon the data stored in the four bit latch 301 of the select/R buffers 300. The outputs from the select/R buffers 300 may also be utilized for logic level output lines subject to the software and electrical restrictions imposed by the system design.

The K lines buffer 310, as shown in greater detail in FIGS. 16A and 16D, are coupled to the Memory Address X/Common bus 340, the data bus 341, the timing and control bus 342, and the PZ bus 343, in the preferred embodiment. The K lines buffer 310 coupled to externally supplied inputs and provide logic level inputs for coupling to the I/O bus 335. In the preferred embodiment, the K line buffers 310 include active pull down devices. In the preferred embodiment, the K lines 310 are utilized to sample the keyboard at periodic intervals. Additionally, the pads 311 to which the K line buffers 310 are coupled also serve as output couplings for four bit test data output when the calculator system is in the test mode, as described in greater detail in copending application Ser. No. 221,454, filed Jan. 19, 1981, Executing an Externally Jammed Instruction in a Calculator in a Test Mode.

The print I/O buffer 325 is coupled to the I/O bus 335. The print I/O buffer 325 is designed so as to provide for communication with an external printer-controller integrated circuit. In a preferred embodiment, the print I/O buffer 325 is used with a pulse-width modulation serial data transmission technique. Included in the print I/O buffer 325 are the address decode, an amplifier, and a latch 331 attached thereto which stores the last fixed logic level transmitted on the serial I/O line in accordance with a desired communication protocol, as described in greater detail with reference to FIG. 25.

The external I/O buffers 330, as shown in greater detail in FIGS. 16C and 16D, provide for bidirectional communication with circuits external to the controller integrated circuit. Included with the I/O buffers 330 are the associated address decode, buffer amplifiers, and I/O pulldown latches 331 as described in greater detail with reference to FIG. 25.

Figure 16B:
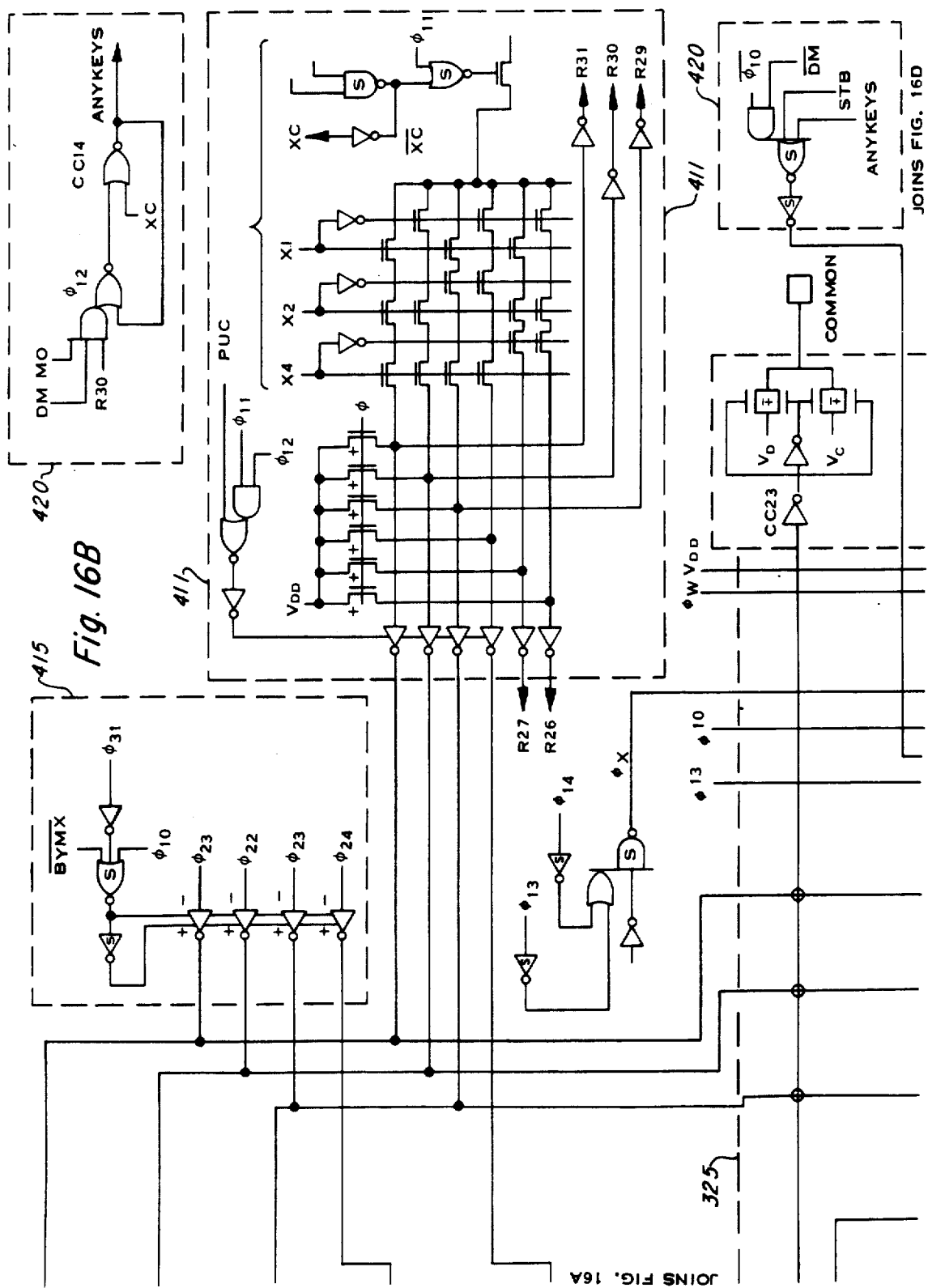

The anykeys latch 420, as shown in greater detail in FIG. 16B, is a software controlled latch which pulls all select/R pads to VDD, the positive supply voltage in the preferred embodiment, when the latch 420 is set. Additionally, the anykeys latch 420 may enable the K-line pull down devices. The anykeys latch 420 is set by any of a plurality of instructions executed after a first predefined X register address is decoded when the controller integrated circuit is in a particular power mode as determined by the output from the mode latches 371. In the preferred embodiment, the anykeys latch 420 is set by any instruction executed after addressing the X register 30 when the calculator system is in a process and display mode. The anykeys latch is reset in response to receiving an X register address less than a second predefined value. In the preferred embodiment, the second predefined value is 24.

Figure 14A:
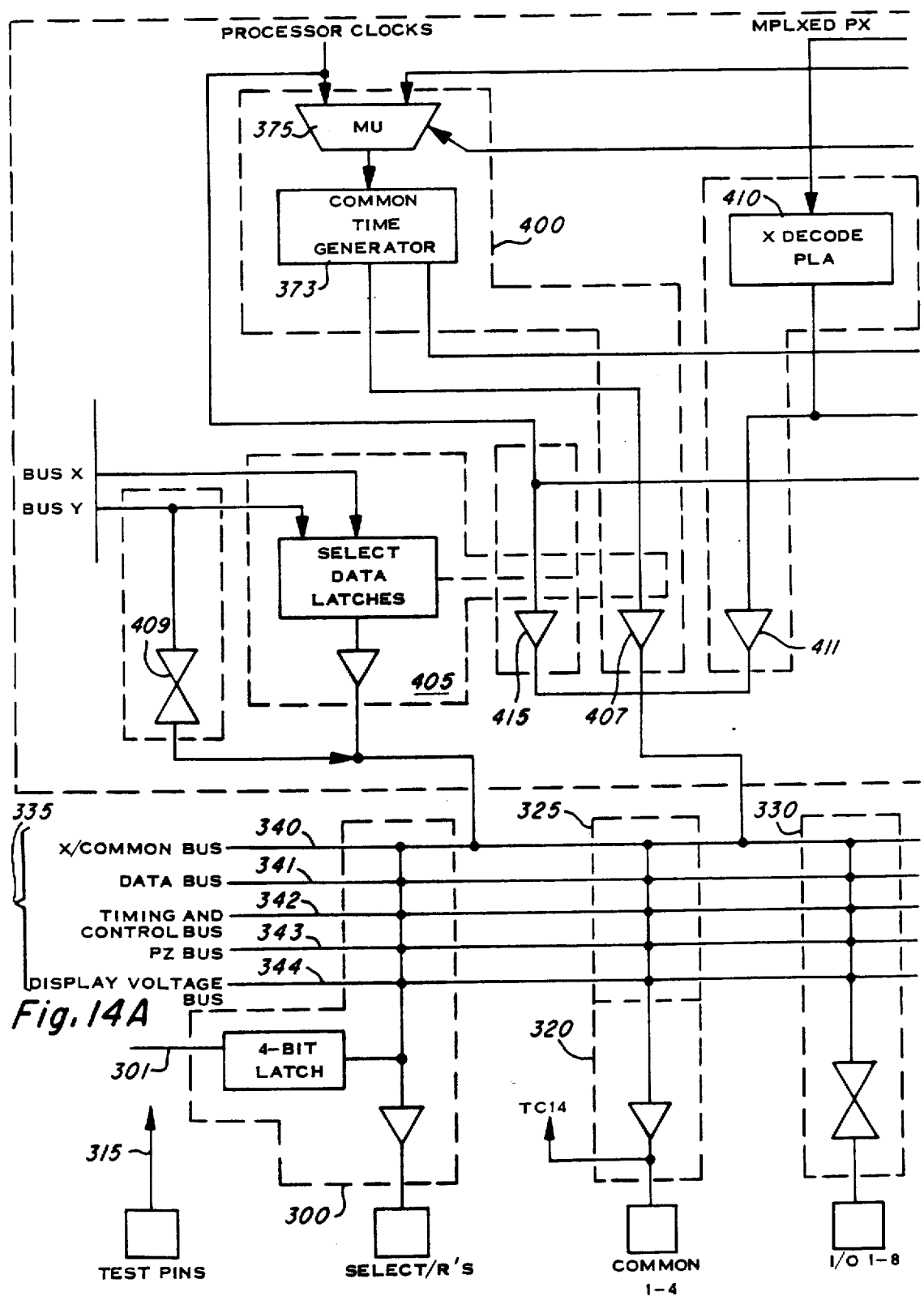
FIGS. 14A-B together form block diagram of a preferred embodiment of the memory mapped I/O in a modular controller integrated circuit as described with reference with FIGS. 12A-B and 13A-B.
Figure 14B:
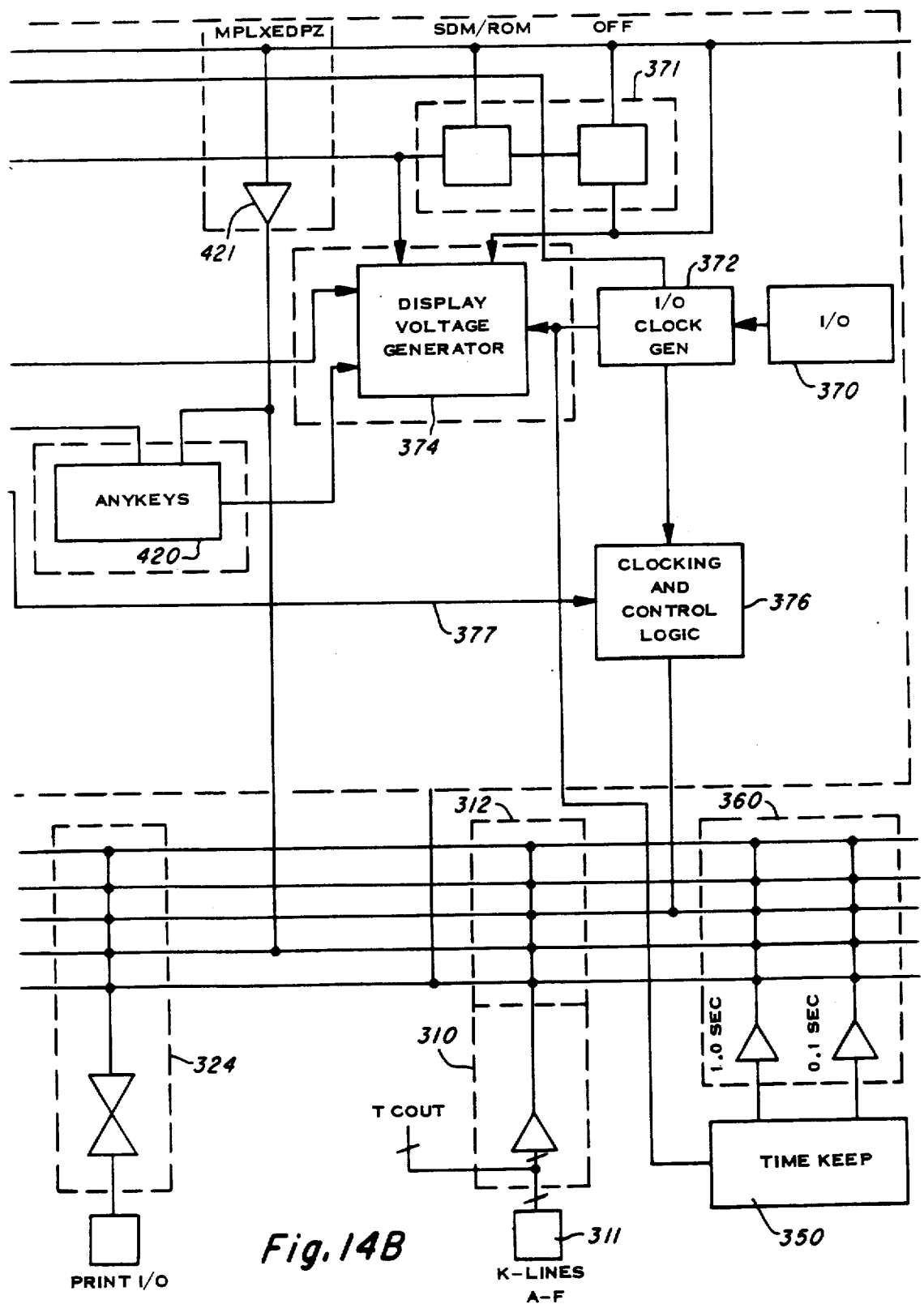

In the preferred embodiment, the I/O section as shown in FIGS. 14A and 14B appears as an extension of RAM memory to the processor and to the instructions as determined by the software. The I/O section is addressed by the same memory pointers that address the processor read/write memory RAM. In a preferred embodiment, a multiple memory pointer system may be utilized such as disclosed copending application Ser. No. 196,892, Data Processing System Having Multiple Buses and Application Ser. No. 196,808, Multiple Memory Pointer System, both filed Oct. 14, 1980. The data transfer polarity may be determined by the same read and write microcodes which control the processor RAM. The anykeys latch 420 is reset when the main ocilator latch (MO) of the mode control latches 371 provides an active level output and when the X register address received on the X/common bus 340, contains an address less than 24. The anykeys latch 420 is set when the display mode (DM) and the MO latches of the mode control latches 371 both provide active outputs, and the address output on the X/common bus 340 is 30. The select data latches 405 may be written into when the received address from the X/common bus 340 is 27, when a microcode bit BXMX is at an active logic level (1), and when the MO latch of the control mode latches 371 provides an active output. The print/I/O buffer 325 is written into when the X/common bus 340 contains the address 28, when a microcode bit BXMY is at an active (o) or low logic level, when a microcode bit BYMX is at an active or high logic level, and when the output of the MO latch of the control mode latches 371 is at an active output level. The print buffer may be read from when the X/common bus 340 contains the address 28, when the microcode bit MXBY is at an active logic level, when the microcode bit BYMX is at an inactive logic level, and when the output from the MO latch of the mode control latches 371 is at an active level. The outputs from the select data latches 405 are written into the select/R buffers 300 when the X/common bus 340 contains the X register address 29, when the PZ bus 343 contains the word address 0000–1011 (binary), when the microcode bit MXBY is at an inactive level, when the microcode bit BYMX is at an active output level and the output from the MO latch of the mode control latches 371 is at an active logic level. The four most significant bits, KA–KD, of the K line buffers 310, may be read when the X/common bus 340 contains the X register address 30 when the PZ bus 343 contains the word address 0011 or 1011 (base 2), when the microcode data bit MXBY is at an active logic level, when the microcode bit BYMX is at an inactive logic level, and when the output of the MO latch of the mode control latches 371 is at an active logic level. Additionally, when the X/common bus 340 contains the address 30, and when the PZ bus 343 contains the word address 0100 or 1100, when the microcode data bit MXBY is at an active logic level, when the microcode data bit BYMX is at an inactive logic level, and when the MO latch of the mode control latch 371 is an active output level, then the least significant bit, KE, input from the K line buffers 310 is read to the data bus 341. Finally, when the X/common bus 340 contains the register address 31 (base 10), the PZ bus 343 contains the word address 0000–0101 or 1000–1011 (base 2), when the microcode data bit MXBY is inactive, when microcode bit BYMX is active, and when the mode control latch 371 provides an active MO output and an inactive DM output, then the select/R buffers 300 may be written into with the R data.

When the PZ bus 343 contains a 0 address, either select addresses S0A and S0B or outputs R0–R3 are selected depending on whether the select buffers or the R buffers are being addressed. The R-line addresses are repeated starting at PZ bus 343 output equal to 8, because the most significant bit of the PZ bus 343 is disabled, in the preferred embodiment, during decode of the control information, so as to allow selection of four R lines at any given time. The R-line addresses are written underneath the bit of the data bus 341 to which the particular R line is coupled to.

Figure 15:
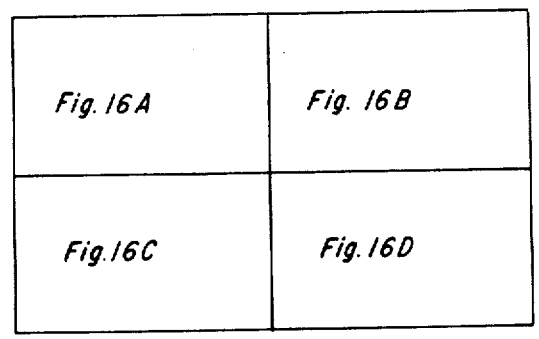
FIG. 15 shows the layout interrelationship of FIGS. 16A-D.

Referring to FIG. 15, the layout interrelationship of the FIGS. 16A to 16D is shown. Referring to FIGS. 16A to 16D, common time generator logic 400 is shown including the common time generator 373, the multiplexor 375, and the buffer 407. Additionally, the PZ bus buffer 421 is shown (FIG. 16A). The processor internal bus to I/O data bus 341 interface transciever 409 is shown in FIGS. 16A and 16C. The address decode means 325 and associated common buffer 320 is shown in FIGS. 16A to 16B. The processor clock to common bus interface 415 is shown in FIG. 16B. The anykeys latch 420 is shown in FIG. 16B. The X-decode PLA 410 is shown in FIG. 16B also. The select data latches 405 is shown in FIG. 16C. The data bus 341, timing and control bus 342, the PZ bus 343, and Memory Address X/Common bus 340, are shown in FIGS. 16C and 16D, while the display voltage bus is shown in FIG. 16D. The K line buffers and associated decode 310 and 312, the I/O Buffers 330 and associated decode, the print I/O buffer 324 and associated decode, the select/R buffer and associated decode 300, and four bit latch 301, are shown in FIGS. 16C and 16D.

Figure 17:
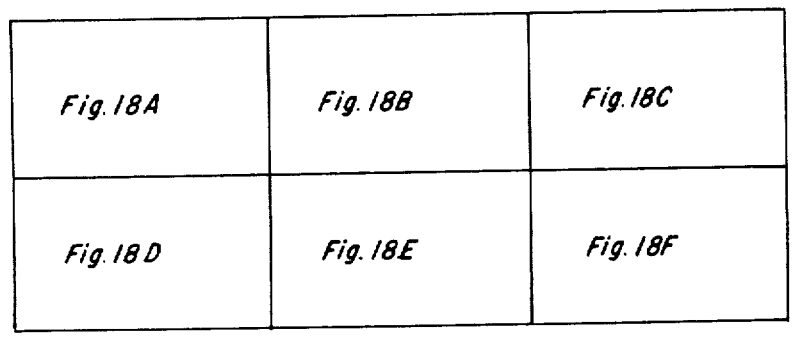
FIG. 17 shows the layout interrelationship of FIGS. 18A-F.
Figure 18A:
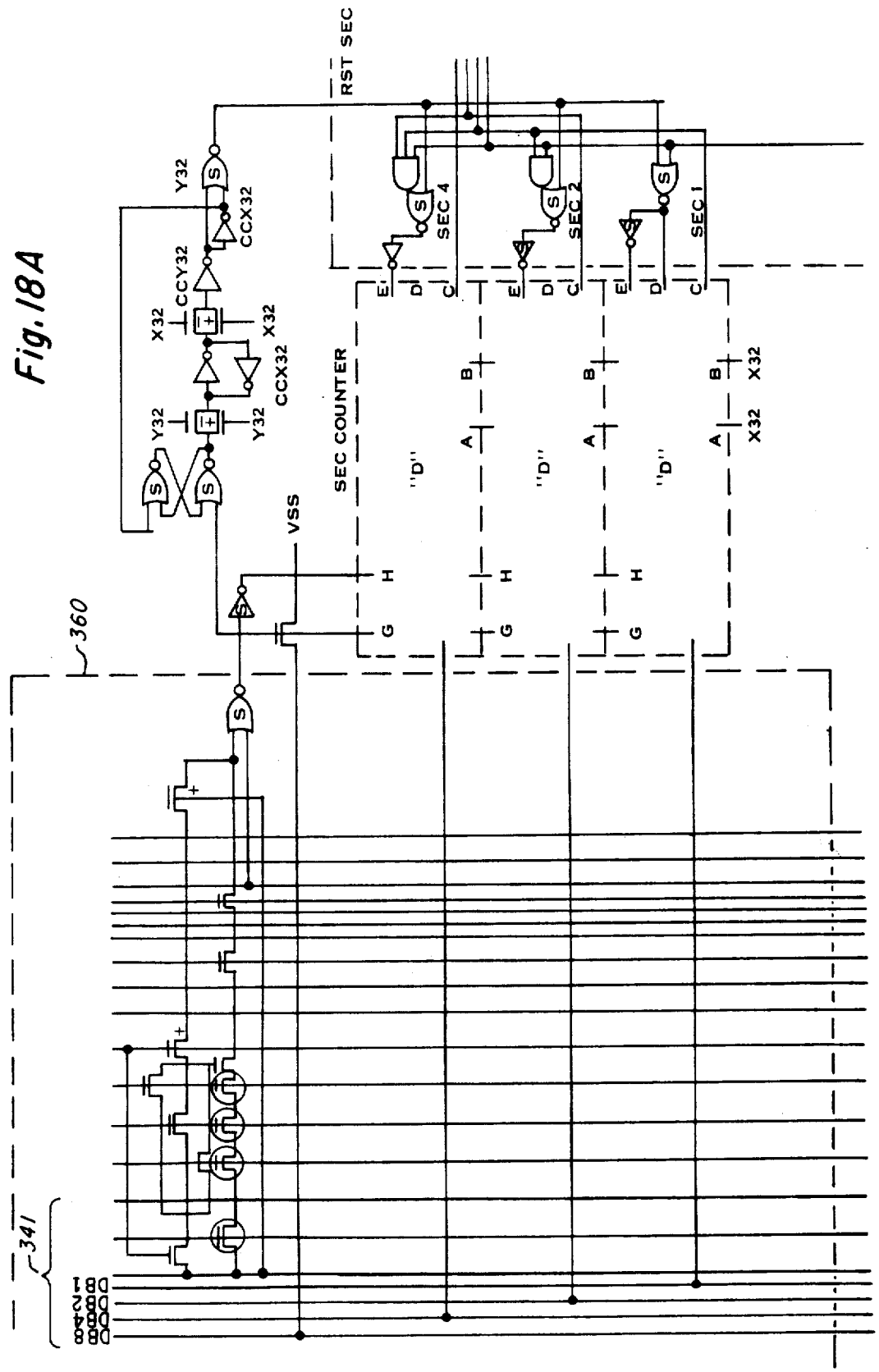
Figure 18D:
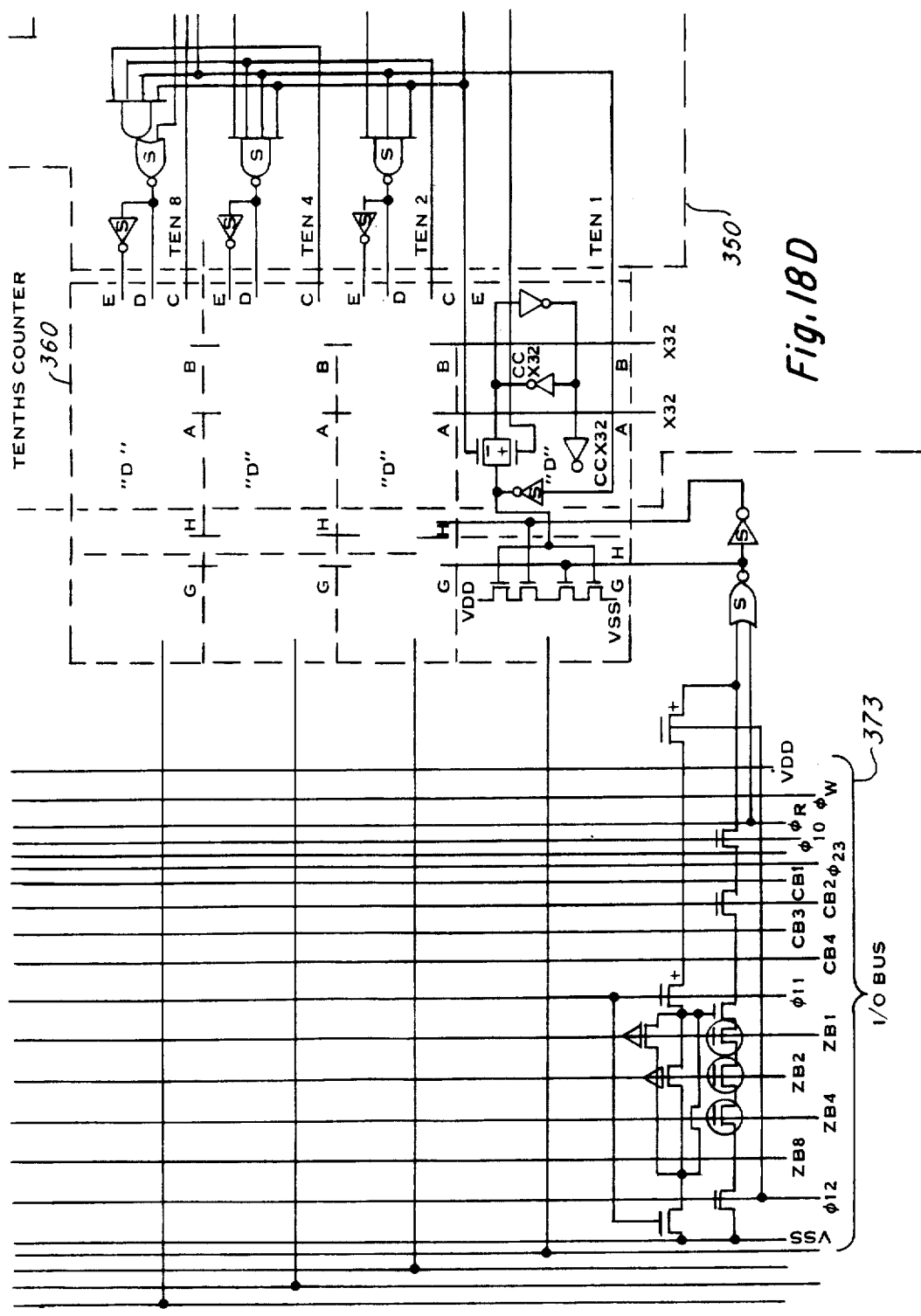
Figure 18E:
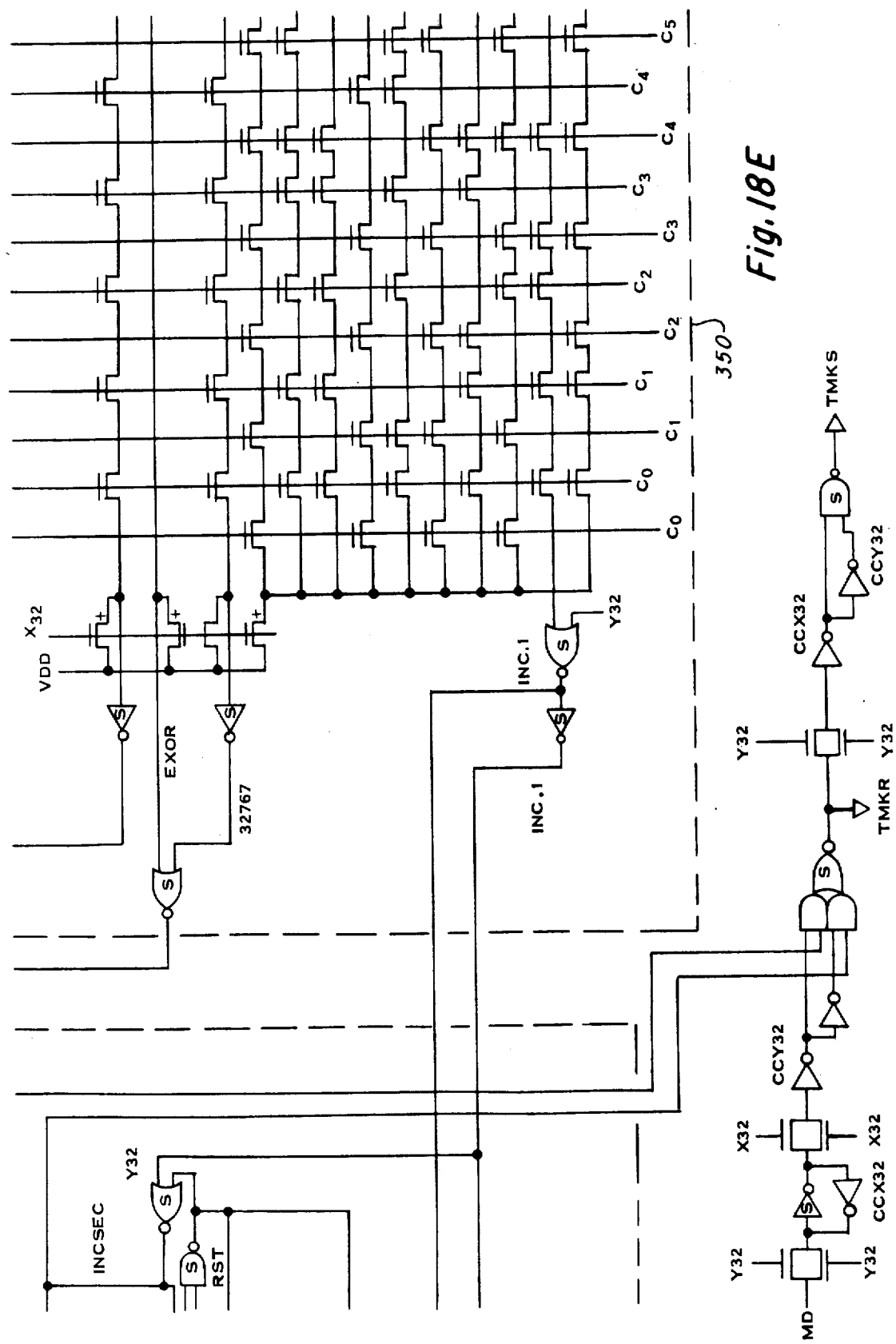
Figure 18F:
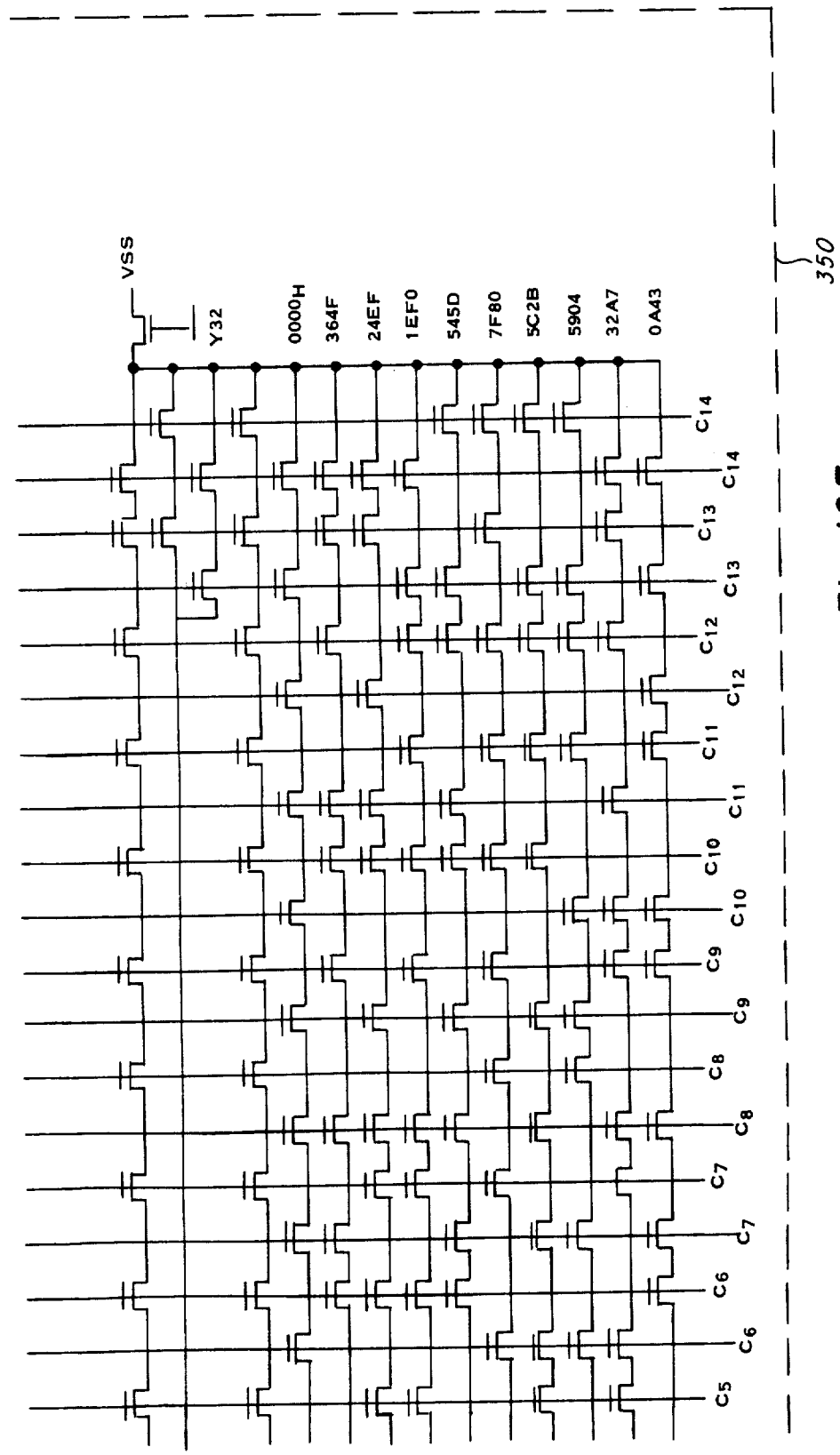

Referring to FIG. 17, the interrelationship of FIGS. 18A to 18F is shown. The timekeeping logic 350 and associated address decode 360 of FIG. 14B is shown in greater detail in FIGS. 18A to 18F. More specifically, the timekeeping logic 350 is shown in detail in in FIGS. 18B, 18C, 18E and 18F, and the associated address decode and coupling to the bus 335 is shown in FIGS. 18A and 18D.

Figure 19:
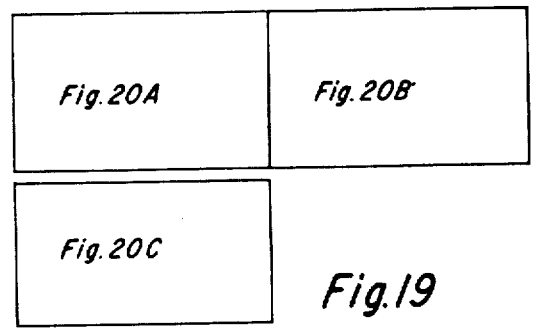
FIG. 19 is a schematic interrelationship diagram of FIGS. 20A and 20B.
Figure 20A:
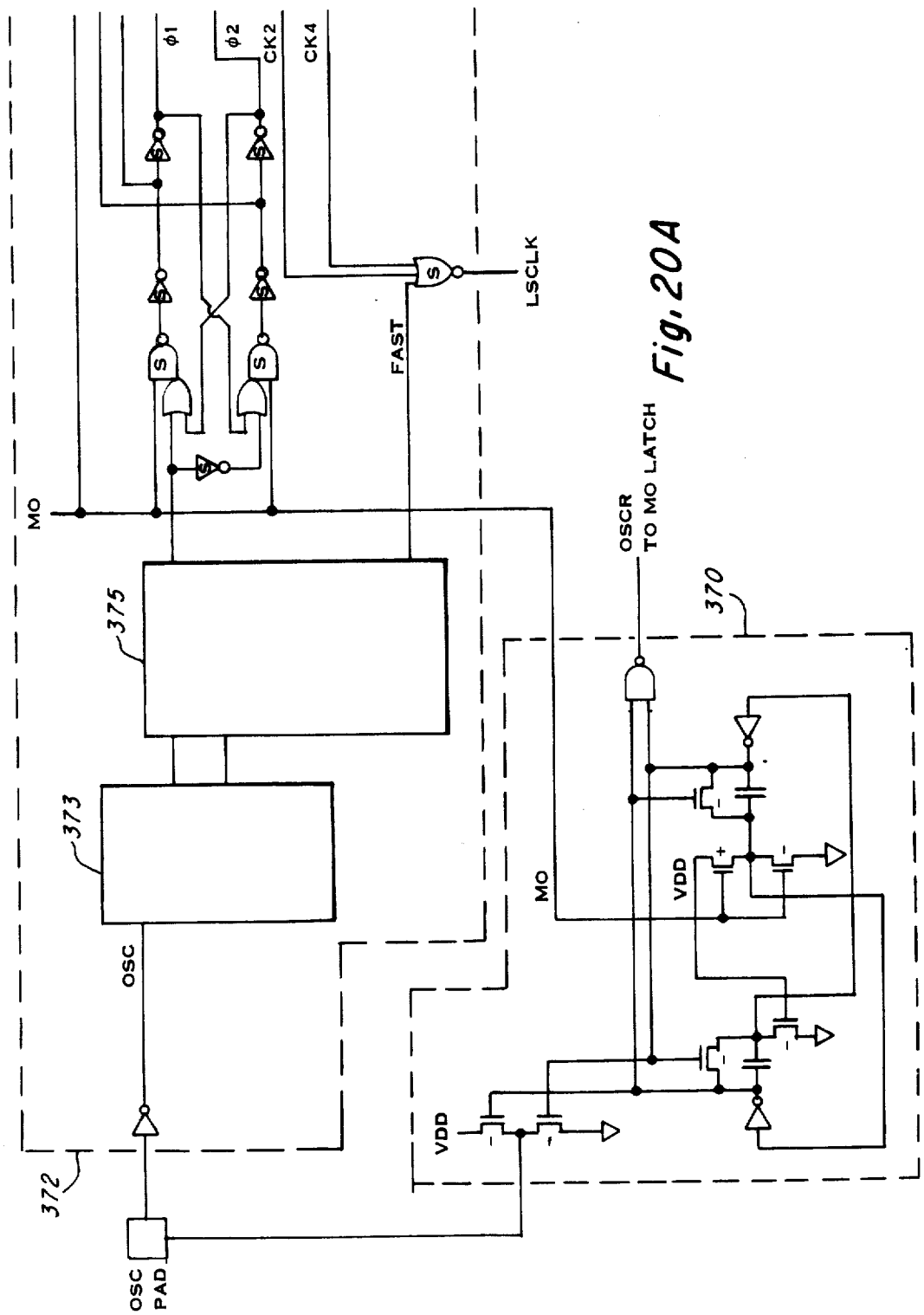
Figure 20B:
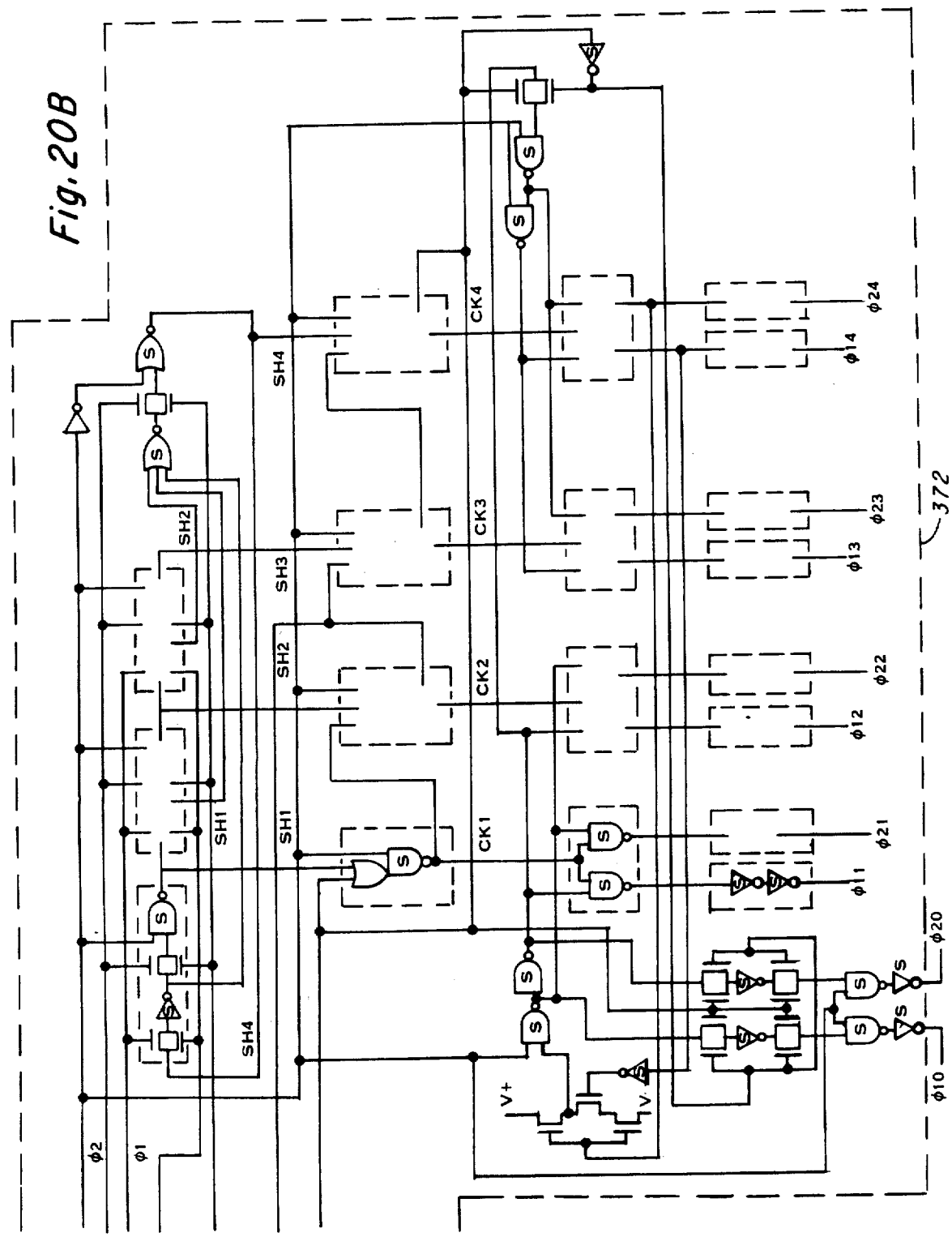

Referring to FIG. 19, the schematic interrelationship of FIGS. 20A to 20B is shown. Referring to FIGS. 20A–20C, a detailed schematic representation of the I/O oscillator 370, I/O clock generator 372, and logic associated therewith is shown, as described with reference to FIG. 14B. The Main (processor) oscillator 370, and associated divide logic 373 and speed select logic 375 is shown in FIG. 20A, with the main oscillator portion of the I/O oscillator 370 shown in FIG. 20C. The I/O Clock generator 372 is shown in FIG. 20C.

Figure 21:
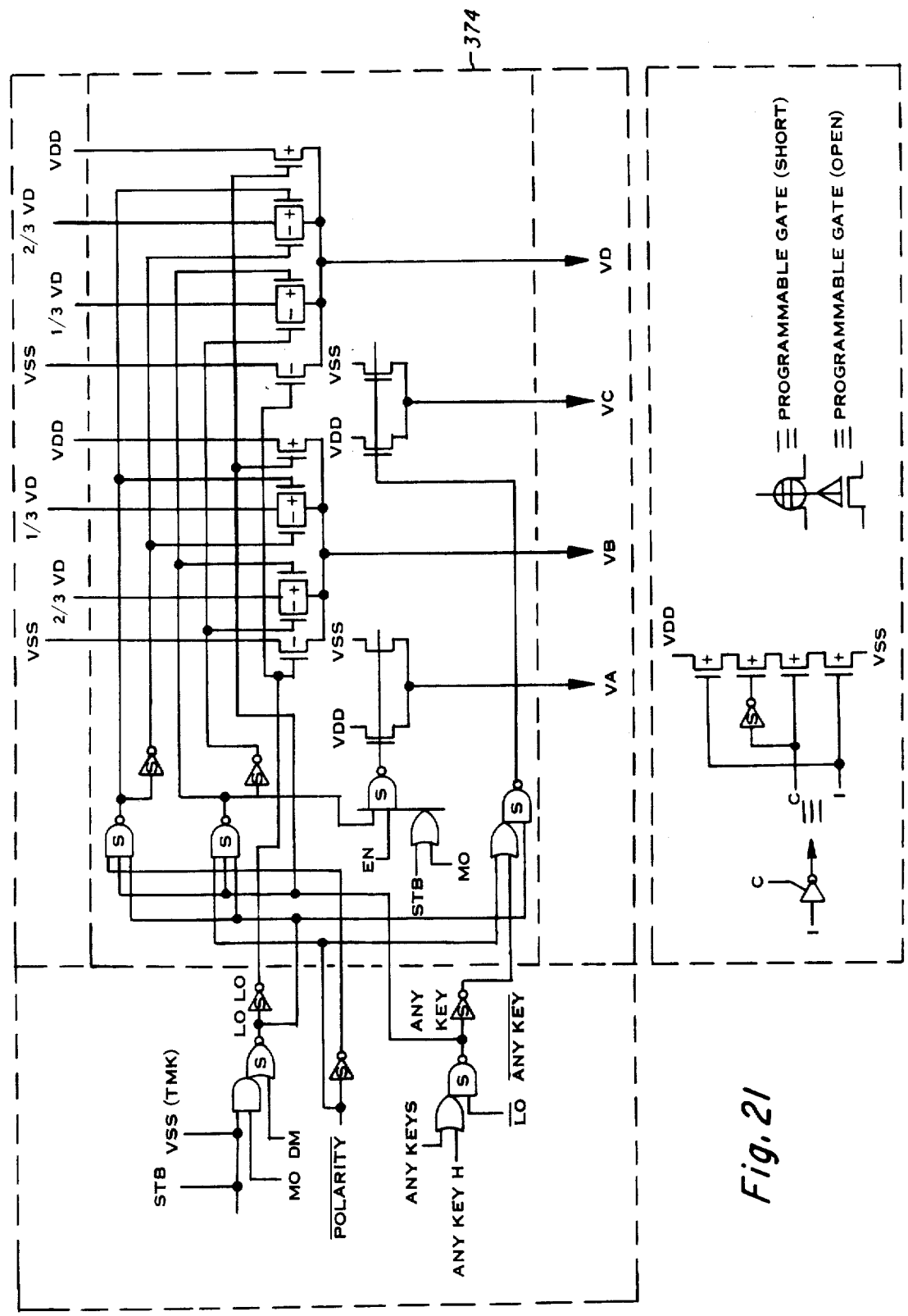
FIG. 21 is a detailed schematic diagram of the display voltage generator of FIG. 14B.

Referring to FIG. 21, the display voltage generator 374 of FIG. 14B is shown in greater detail. Also shown in FIG. 21 is a key as to schematic conventions used in the figures.

Figure 23:
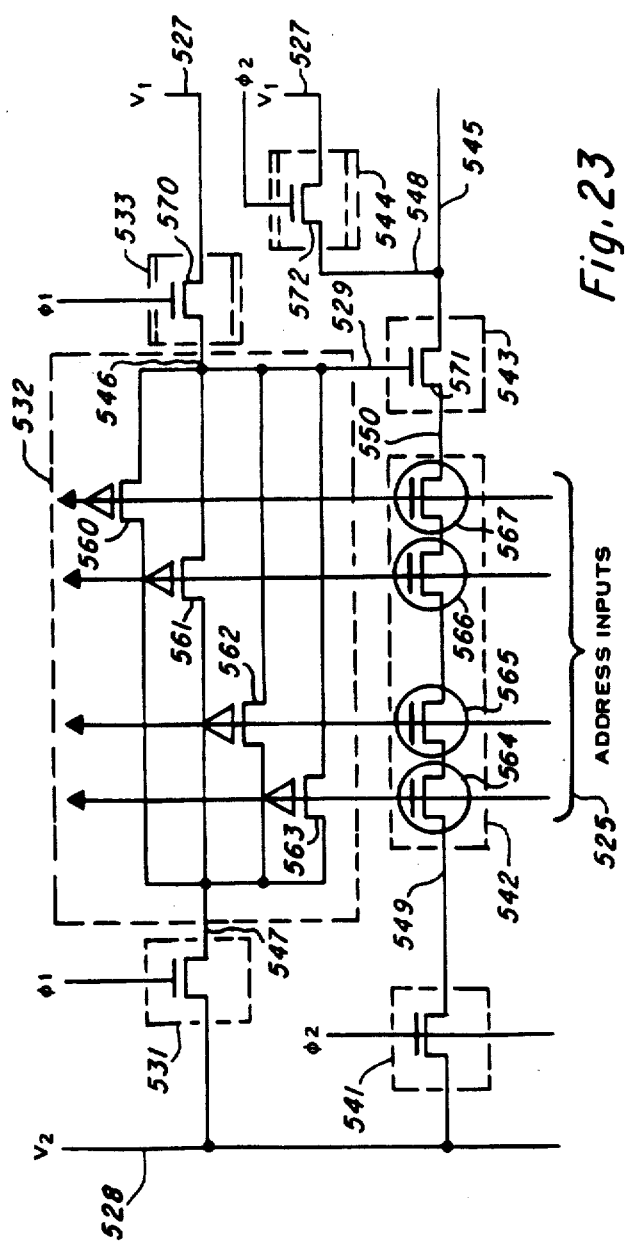
FIG. 23 is a detailed schematic embodiment of the address decode circuit of FIG. 22.

Referring to FIG. 22, a block diagram of the address decode means coupled to the I/O bus 335 and coupled to individual associated buffers of FIGS. 14A and B is shown. FIGS. 22–24 provide detailed schematics of the address decode circuits (i.e. 325, 312, 360 etc.) coupled to the bus 335 of FIGS. 14A–14B, and of FIGS. 16A–16D. Referring to FIG. 22, an address decode circuit having noncomplementary address inputs 525 is comprised of a first decode circuit means 530 for receiving the address inputs 525 and for selectively providing an active first decode output 529 in response to decoding a first logic level in a predefined combination from the received address inputs 525. A second decode circuit means 540 is coupled to the address inputs 525 for receiving the address inputs, and is coupled to the first decode means 530. The second decode means selectively provides an active second decode output 545 in response to coincidentally 1) decoding a second logic level in the predefined combination from the received address input and 2) receiving the active first decode output 529 from the first decode means 530. The active second decode output 545 is thereby indicative of the address inputs having the desired predefined combination. In the preferred embodiment, the first decode means 530 and second decode means 540 are programmable so as to allow selection of the desired predefined combination of the first and second logic levels. In other words, the first decode means 530 and second decode means 540 may be selectively programmed, either by hardware programming during the processing of the integrated circuit or electrical programming after completion of processing. The address decode circuit 520 having noncomplementary address inputs may be further comprised of a clock circuit means 522 for providing a first clock output 524 and a second clock output 523. The clock means 522 provides an active first clock output 524 having a first active time interval and an active second clock output 523 having a second active time interval, as shown in the FIG. 24 with reference to $\emptyset 1$, and $\emptyset 2$, respectively. Additionally, the address decode circuit 520 may be comprised of power means 526 for providing a first voltage output 527 at a first voltage level $V_1$ and a second voltage output 528 at a second voltage level $V_2$. A first precharge means 533, within the first decode means 530, is coupled to the first voltage output 527 of the power means 526 and to the first clock output 524 of the clock means 522. First precharge means 533 selectively provides a first precharge output 546 during the active (first voltage level) clock output portion of the first active time interval. The first precharge output 546 is provided at the first voltage level in response to receiving the first clock output 524. A first discharge means 531 within the first decode means 530 is coupled to the second voltage output 528 of the power means 526, and to the first clock output 524 of the clock means 522. First discharge means 531 selectively couples a received input 547 from first logic means 532, within the first decode means 530, to the second voltage output 528 in response to receiving the active first clock output 524. The first logic means 532 is coupled to the output 546 of the first precharge means 533 and provides the output 547 coupled to the first discharge means 531. The first logic means selectively isolates the received first precharge means 533 output 546 from the output 547, coupled to the first discharge means 531, in response to receiving a predefined first combination of address inputs 525.

The second decode means 540 is further comprised of a second precharge means 544, coupled to the first voltage output 527 of the power means 526 and coupled to the second clock output 523 of the clock means 522. Second precharge mean 544 selectively provides a second precharge output 548 for the duration of the second active time interval, as shown with reference to signal ∅2 of FIG. 24. Second precharge means 544 provides the second precharge output 548 at the first voltage level in response to receiving the active second clock output 523. A second discharge means 541 is coupled to the second voltage output 528 of the power means 526 and is coupled to the second clock output 523 of the clock means 522. Second discharge means 541 selectively couples a received signal 549 to the second voltage output 528 in response to receiving the active second clock output 523. A second logic means 542 is coupled to the second discharge means 541 for selectively coupling a received input 550 from an isolation means 543 via signal 549 to the input of the second discharge means 541 in response to receiving a predefined second combination of address inputs. The isolation means 543 is coupled to the second logic means 542 for, selectively coupling the input 550 to the second logic means 542. The isolation means 543 is further coupled to the output 548 from the second precharge means 544, and is also coupled to the first decode output 529 from the first logic means 532. The isolation means 543 provides an output 545 indicating the decode circuit 520 has received a predefined combination on the received address inputs 525. The isolation means 543 provides the decode output 545 in response to receiving the second precharge output 548, and the active first decode output 529 when the second logic means 542 couples the received input 550 to the second discharge means input 549. This couples the isolation means 543 to the second voltage output, and causes the output 545 from the isolation means 543 to be coupled to the second voltage output $V_2$ thereby indicating a true decode of the desired address.

The controller chip integrated circuit of FIGS. 14A and 14B has a plurality of addressable function modules and is comprised of address bus means, such as memory address X/common bus 340, for providing noncomplementary address outputs 525 and power bus means 526 for providing a first voltage output 527 at a first level and a second voltage output 528 at a second level as shown with reference to FIGS. 22–24. The first precharge means 533 is coupled to the first voltage output 527 for providing an output 546 at the first level for a first time interval, as determined by the clock output 524 of the clock means 522. The first logic means 532 is coupled to the address inputs 525 and to the second voltage output 528 via the first discharge means 531, and is coupled to the output 546 of the first precharge means 533. The first logic means 532 includes means for selectively providing a first decode output 529 at the first level, during a second time interval commencing subsequent to the commencement of the first time interval, responsive to the clock means 522, when the received address inputs 525 are at a predefined combination. Additionally, the first logic means 532 includes means for selectively providing the first decode output 529 at the second level during the second time interval when the received address outputs are not at the predefined combination. The second precharge means 544 is coupled to receive the first voltage output 527, for providing an output 548 at the first level for a third time interval commencing subsequent to the commencement of the second time interval, responsive to the clock means 522. A second decode means 542 is coupled to receive the address inputs 525, the second voltage output 528 via signal 549 of second discharge means 541, and the second precharge means 544 output 548. Isolation means 543 includes means for selectively providing an output 545 at the second level during the third time interval when the received address outputs are at the predefined combination, and further includes means for selectively providing the output 545 at the first level during the third time interval when the received address outputs are not at the predefined combination. The first time interval, second time interval, and third time interval as described above may be better understood by reference to the ∅1, ∅2, and latch decode signal waveforms of FIG. 24.

Referring to FIG. 23, a detailed schematic embodiment of the address decode circuit of FIG. 22 is shown. Corresponding functional blocks of FIG. 22 are appropriately numbered in FIG. 23. In this preferred embodiment, the first logic means 532 is comprised of an array of parallel transistors 560–563, the input to each of the transistors 560–563 in the array 532 being coupled to an independent and separate address input 525. In the preferred embodiment each transistor 560–563 is selectively open circuitable in response to a programmed first matrix input. That is, the transistors 560–563 in the array 532 may be selectively programmed, either during processing via mask level layout or after processing via electrical programming, so as to define the predefined combination of address inputs to which the first logic means 532 will respond. The second logic means 542 may be comprised of an array of transistors 564–567 in series connection, an input of each of the transistors 564–567 being coupled to an independent and separate address input 525, with each of the transistors 564–567 in the array being selectively short circuitable in response to receiving a programmed second matrix input. In a manner similar to that described above with reference to the first logic means 532, the programmability of the second logic means 532 may be achieved via processing by mask level design and layout or ion implantation, or after processing of the integrated circuit by electrical programming. The function served by the first logic means 532 and the second logic means 542 is determined in part by the semiconductor process by which the devices are constructed.

For an N-channel process, the function of the first logic means 532 is to decode a predefined combination of zeros, that is second level voltage inputs, from the address inputs 525. In this embodiment, the individual transistors 560-563 are selectively programmed to be open circuited where it is not desired to decode the zero on the corresponding address input 525, and are not programmed to be open circuited, that is are left intact in the array 532, where it is desired to decode a zero. When the address inputs 525 which is coupled to non-open circuited transistors in the array 532 contain a second level voltage input, the decode logic 532 will not couple the output 546 from the first precharge means 533 to the input 547 of the first discharge means 531, thereby preventing discharge of the first decode output 529. First decode output 529 is at the first voltage level after the first time interval because of the precharge action of transistor 570 of the first precharge means 533 coupling the first decode output 529 to the first voltage output 527. When the first decode output 529 is at the first level, the isolation means 543 is enabled, that is transistor 571 is turned on, thereby coupling the second precharge means output 548 to the second decode logic means 542. If a first voltage level output is present on the address inputs 525 which are coupled to the non-open circuited transistors of the array 532, then the output 529 is discharged to the second voltage output level, thereby enabling the isolation means 543. Thus the second precharge output 548 is not coupled to the second decode means 542, and instead the second precharge output 548 is coupled to the decode output 545, providing an output 545 at the first level, indicative of a false decode.

In this N-channel embodiment, the function of the second decode means 542 is to decode a predefined combination of ones, that is first voltage level outputs, received on the address inputs 525. The transistors 564-567 of the second decode means 542 are coupled in series connection, and are selectively programmable to be short circuited. The short circuits may be programmed by the same means as was described above with reference to the programmable open circuits. When the address inputs 525 which are coupled to the nonshortcircuited transistors of the second decode array 542 are at the first voltage level (ones), the transistors of the second logic means 542 are enabled, thereby providing a discharge path from the isolation means 543 to the second voltage output 528 of the discharge means 541. The discharge path via second discharge means 541 is not present until the second clock $\emptyset 2$ activates the second discharge means 541, thereby allowing time for the first logic means 532 to perform its function and provide an active or inactive first decode output 529 according to the state of the address inputs 525. When the desired combination of the address inputs is provided to the first logic means 532 and to the second logic means 542, the isolation means 543 is enabled so as to couple the precharge voltage output 548 from the second precharge means 544 and the decode output 545 to the second logic means 542, which provides a serial discharge path via discharge means 541 to the second voltage 528, thereby discharging the decode output 545 to the second voltage level, providing an indication of a true address decode. The first discharge means 531 and second discharge means 541 provide power supply isolation during the corresponding precharge intervals of the first precharge means 533 of the first logic means and second precharge means 544 of the second logic means 542, respectively. Alternatively, if the address bus is precharged to a low logic level prior to activation of the first precharge means 533, the first discharge means 531 may be eliminated and replaced by a short circuit to the second voltage level 528.

In a P-channel embodiment of the present invention, the first logic means 532 functions to decode the first logic level, ones, and the second logic means 542 functions to decode the second logic level, zeroes. The transistors 560-563 of the first decode means 532 are left coupled to those address inputs 525 upon which a one is desired to be decoded. All other transistors of the first decode means 532 are programmed to be open circuits independent of the address inputs 525. If all address lines 525 to which non-open circuited transistors of the first logic means 532 are coupled are at the first logic level, then the first decode output 529 will remain precharged to the first voltage level, because the first logic means 532 will provide isolation between the first precharge means 533 and the discharge means 531. If a second logic level, zero, is present on any of the address inputs 525 coupled to a non-open circuited transistor of the first decode means 532, then that transistor will be enabled, thereby coupling the first decode output 529 to the input of the first discharge means 531. This discharges the first decode output 529 to the second voltage output level 528, thereby disabling isolation transistor 571, and causing the decode output 545 to remain at the first voltage output level 527 responsive to the output of the second precharge means 548. However, when the first decode means 532 decodes the desired address, the first decode output 529 is at the active first voltage output level which enables isolation transistor 543 so as to couple the second logic means 542 to the second precharge means 544 and to the output 545. The function of the second decode means 542, is to provide for decode of the second logic level, zeroes, in the P-channel embodiment. The transistors 564-567 of the second decodes means 542 are selectively coupled to the address inputs 525 corresponding to the desired address lines which are desired to be at the first logic level, one. The remaining transistors in the second decode means 542 are programmed to be short circuited, so as to, in essence, be continuously activated. When the address inputs 525 coupled to the non-short-circuited transistors of the second decode means 542 are at second logic level (zero), then the transistors to which those inputs are coupled will be activated, thereby providing a discharge path from the decode output 545 (and first precharge output 548) to the second voltage output level 528, via isolation means 543 and discharge means 541. The first discharge means 531 and second discharge means 541 provide power supply isolation during the precharge times of the first precharge means 533 and second precharge means 544, respectively. If the address inputs 525 are precharged to a high, first voltage level, before $\emptyset 1$, that is before the first precharge means 533 is activated to thereby couple the first voltage output to the first decode means 532 and first decode output 529, then the first discharge means 531 will not be required, and may be replaced by a short circuit.

In a CMOS embodiment of the present invention, the preferred embodiment, the function of the first decode means 532 and second decode means 542 is selected to be either the N-channel (second level true) or the P- channel (first level true) decode scheme. Additionally, in CMOS, no bootstraping circuitry is required for the precharge means 533 and 544, and, the precharge transistors 570 and 572 may be made complementary to the remainder of the decode circuitry. Additionally, in a manner similar to that for the P-channel and N-channel techniques, the first discharge means 531 may be eliminated if the address lines 525 are precharged to the off-state voltage of the decoder circuitry prior to the enablement of the first precharge means 533 by the first clock active level. Referring to FIG. 24, the signal timing diagram for the circuitry of FIG. 23 is shown. A first clock output ∅1, commences prior to the second clock output ∅2, and the decode true output becomes valid subsequent to the commencement of the second clock output ∅2. The address lines 525 must go to a valid true level prior to the end of the active period of the first clock ∅1, and prior to the commencement of the active period of the second clock output ∅2. Additionally, the timing for the optional precharge of the address bus so as to eliminate the need for the first precharge means 531 is shown, requiring that the address bus be precharged prior to the commencement of the first clock output ∅1 active state.

With the non-complementary address decode invention as described with reference to FIGS. 22–24, a minimum number of address lines are required to be provided on the address bus, thus minimizing the amount of space necessary for address bus runs on the integrated circuit. Furthermore design and layout may be implemented with minimum spacing between the address lines, since the power supply busses are on either side of the decode circuit, and there are no gates between the address lines, only transistors. This provides for a very space efficent layout, and minimizes bar size. A further savings is realized in that this address decode scheme overlays the address lines, thereby utilizing minimal bar area for decode circuitry beyond that required for the address lines themself.

Figure 25:
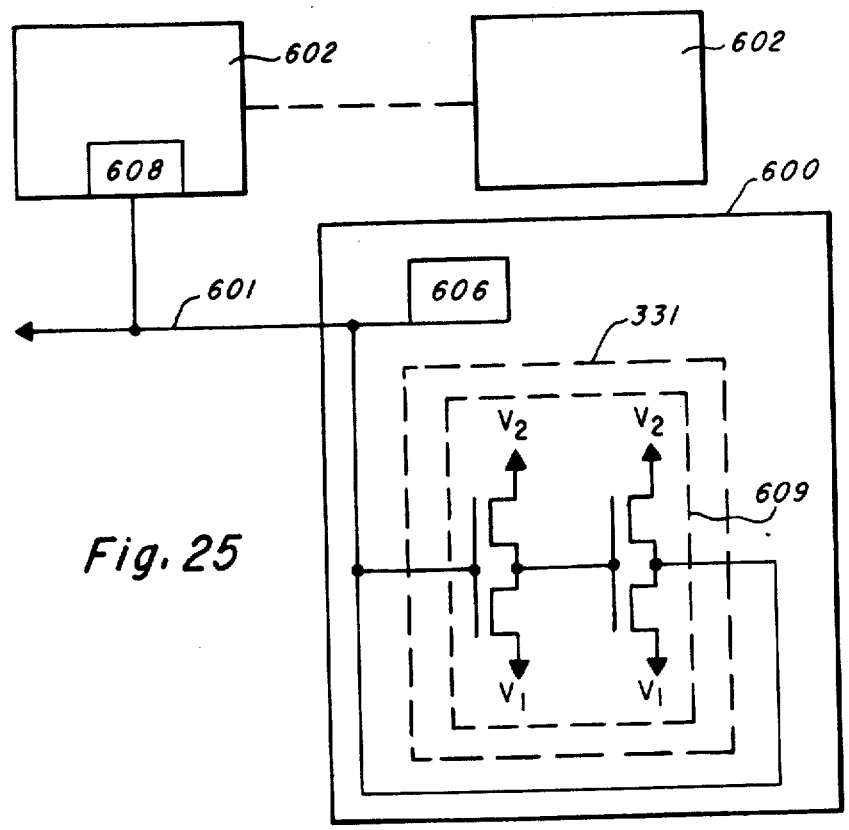
FIG. 25 is a partial schematic partial block diagram of a preferred embodiment of an I/O pull down latch as contained within a controller integrated circuit, as described with reference to FIG. 16D.

Referring again to FIG. 16D, the I/O pull down latch 331 will now be described in greater detail. The I/O buffers 330 and print I/O lines 324 each contain a means 331 for controlling the logic level of the bus lines to which the means 331 is coupled when there is no other active device controlling the bus lines. This is of particular importance when a communications protocol exists between integrated circuits coupled to the I/O bus lines as described in greater detail in copending applications Ser. No. 163,025, Memory with Variable Digit Addressing Mode, Ser. No. 163,023, Data Processing System and Ser. No. 163,024, Memory Interface System, all filed June 26, 1980. The I/O pull down latch 331 controls the default state of a bus line to which it is coupled without requiring pull up or pull down resistors and without requiring additional control lines. Referring to FIG. 25, a preferred embodiment of the I/O pull down latch 331 is shown as contained within a controller integrated chip 600. The I/O pulldown latch 331 is coupled to a bus line 601 which couples to a second integrated circuit 602. The pull down latch may alternately be a separate integrated circuit. As described with reference to FIG. 16D, there are a plurality of I/O lines 601 and a plurality of I/O latches 331 each coupled to one of the control lines 601. Additionally there may be a plurality of integrated circuits 602, each integrated circuit coupling to the I/O bus lines 601. In the preferred embodiment, a read/write memory bit 609 (bus control memory bit) is coupled to the bus line 601 which is to be controlled, forming a transparent latch. Other forms of transparent latches may be utilized such as those in bipolar or MOS technology. A communications protocol is established wherein the last integrated circuit device, 600 or 602, to write onto the bus line 601 must set the bus line to a default (no-up) condition, as described with reference to copending applications Ser. No. 163,023, Data Processing System and Ser. No. 163,024, Memory Interface System, both filed June 26, 1980. However, this invention may also be utilized independent of the communications protocol. In the preferred embodiment, the default condition is a logic zero level. The bus control memory bit 609 is sized so that it may be overdriven by any driver attached to the bus line 601. Thus, the output buffer driver circuits of the integrated circuit 600 or of the integrated circuit 602 may overdrive and set the logic state of the transparent latch 609. This approach has the advantage of dissipating virtually no power once the line has been set to one or the other logic level. In the preferred embodiment, only one bus line control bit 609 is coupled to any given bus line so as to ease the task of overdriving the bus line. The integrated circuit 602 may be RAM, ROM, or other I/O integrated circuits. A first driver means 606 provides an output at a fixed voltage level on the bus line 601 for a first time interval during which the controller circuit 600 is communicating information onto the bus 601. Upon completion of communication, the first means 606 causes its output to go to a high impedance level, thereby allowing the voltage on the bus line 601 to float independent of the driver 606. The memory control bit 609 is coupled to the bus line 601, and stores the fixed voltage level output from the first driver means 606 during the first driver time interval as a result of the first means 606 overdriving the memory bit 609. During the subsequent time interval, when the first driver means 606 allows the voltage on the bus 601 to float independent of the means 606, the bus control memory bit 609 couples to the bus line 601 the stored fixed voltage level when it detects the floating non-fixed output condition. Thus, the last fixed voltage level present on the bus 601 which is output from any integrated circuit, 600 or 602, coupled to the bus 601 is stored in the memory control bit 609. The stored fixed voltage level is reoutput onto the bus 601 when none of the integrated circuits, 600 and 602, are providing a fixed voltage level output and all are allowing the bus to float. This I/O memory latch feature is of particular importance in microprocessor, computer oriented, calculator systems, and other bus oriented systems. Thus, the I/O memory latch of the present invention may be implemented in the calculator systems as described with reference to FIGS. 1–4, and FIGS. 5A–C, as well as utilized in combination with other inventions disclosed herein. The communication between the controller integrated circuits and the memory integrated circuits would be via the I/O bus 330 as shown in FIGS. 5A–C, and the additional integrated circuits 602 would be the memory integrated circuits 103 to 107 coupled to the I/O bus.

The novel inventions disclosed herein may be utilized in calculators, learning aids, electronic games, personal computers, and other embodiments not specifically disclosed herein, but evident to one skilled in the art. The true scope of the invention may be better understood by reference to the appended claims.

What is claimed is:

1. An interface system comprising:

a bus means including at least one bus line;

at least one bus driver means for driving each of said bus lines to a selected one of two logic voltages thereby generating a predetermined logic state on said bus means when said bus driver means is actuated and for isolating each of said bus lines from each of said logic voltages by a high impedance when said bus driver means is inactivated; and a default state latch means coupled to said bus means for continuously sensing the voltages on each of said bus lines and for automatically maintaining the last logic voltage on each bus line when all of said bus driver means are inactuated without external control, thereby preserving said predetermined logic state on said bus means.

2. An interface system as claimed in claim 1, wherein:

said default state latch includes a plurality of read/write memory cells, each read/write memory cell continuously coupled to a corresponding bus line.

3. An interface system as claimed in claim 2, wherein:

each of said read/write memory cells has means for continuously writing therein a logic state corresponding to said selected logic voltage on said corresponding bus line and means for reading out a logic voltage corresponding to said logic state written therein.

4. An interface system comprising:

a bus means including at least one bus line;

a first integrated circuit coupled to said bus means having (a) a bus driver means for driving each bus line to a selected one of two logic voltages thereby generating a predetermined logic state on said bus means when said bus driver means is actuated and for isolating each of said bus lines from each of said logic voltages by a high impedance when said bus driver means is inactuated, and (b) a default latch means for continuously sensing the voltages on each of said bus lines and for automatically maintaining the last logic voltage on each bus line when said bus driver means is inactuated without external control, thereby preserving said predetermined logic state on said bus means; and at least one second integrated circuit coupled to said bus means having a bus responsive means for sensing the predetermined logic state of said bus means and generating a control signal corresponding to said sensed predetermined logic state.

5. An interface system as claimed in claim 4, wherein:

at least one of said second integrated circuits further includes a second bus driver means for driving each bus line to a selected one of two logic voltages thereby generating a predetermined logic state on said bus means when said second bus driver is actuated and for isolating each of said bus lines from each of said logic voltages by a high impedance when said second bus driver is inactuated.

6. An interface system as claimed in claim 4, wherein:

said default state latch includes a plurality of read/write memory cells, each read/write memory cell continuously coupled to a corresponding bus line.

7. An interface system as claimed in claim 6, wherein:

each of said read/write memory cells has means for continuously writing therein a logic state corresponding to said selected logic voltage on said corresponding bus line and means for reading out a logic voltage corresponding to said logic state written therein.

8. An interface system as claimed in claim 6, wherein:

each of said read/write memory cells includes a first pair of field effect devices having their gates connected in common to said corresponding bus line and having their source drain paths connected in series between a pair of voltage sources corresponding to said two logic voltages and a second pair of field effect devices having their gates connected in common to the junction of source drain paths between said first pair of field effect devices and having their source drain path connected in series between said pair of voltage sources.

9. An interface circuit comprising:

a bus coupling means for coupling to a bus having at least one bus line;

a bus driver means coupled to said bus coupling means for driving each of said bus lines to a selected one of two logic voltages thereby generating a predetermined logic state on said bus when said bus driver means is actuated and for isolating each bus line from each of said logic voltages by a high impedance when said bus driver means is inactuated; and a default state latch means coupled to said bus coupling means for continuously sensing the voltages on each of said bus lines and for automatically maintaining the last logic voltage on each bus line when said bus driver is inactuated without, external control, thereby preserving said predetermined logic state on said bus.

10. An interface system as claimed in claim 9, wherein:

said default state latch includes a plurality of read/write memory cells, each read/write memory cell continuously coupled to a corresponding bus line.

11. An interface system as claimed in claim 10, wherein:

each of said read/write memory cells has means for continuously writing therein a logic state corresponding to said selected logic voltage on said corresponding bus line and means for reading out a logic voltage corresponding to said logic state written therein.

* * * * *